United States Patent [19]

Lee et al.

[11] Patent Number: 5,585,439
[45] Date of Patent: Dec. 17, 1996

[54] MODIFICATION OF UNSATURATED POLYESTER RESINS FOR VISCOSITY CONTROL

[75] Inventors: L. James Lee, Dublin, Ohio; Reiko Saito, Kamakura, Japan; Debbie Y. Chiu, Columbus, Ohio

[73] Assignee: Ohio State University, Columbus, Ohio

[21] Appl. No.: 623,968

[22] Filed: Mar. 29, 1996

Related U.S. Application Data

[63] Continuation of Ser. No. 324,426, Oct. 14, 1994, abandoned.

[51] Int. Cl.$^6$ .................................................. C08F 8/30
[52] U.S. Cl. ......................... 525/178; 528/271; 528/425; 525/185; 525/190
[58] Field of Search .................... 528/271, 425; 525/178, 185, 190

[56] References Cited

U.S. PATENT DOCUMENTS

| | | | |
|---|---|---|---|
| 5,159,044 | 10/1992 | Bogner | 528/75 |
| 5,212,096 | 5/1993 | Kolhouse et al. | 436/93 |
| 5,290,854 | 3/1994 | Ross et al. | 525/33 |

OTHER PUBLICATIONS

How Ingredients Influence Unsaturated Polyester Properties, Amoco Chemical Company/Bulletin IP–70B, pp. 1–27.

Processing Unsaturated Polyesters Based on Amocoisophthalic Acid, Amoco Chemical Company/Bulleting IP–43b, pp. 1–18.

LMPC—Succeeding where SMC Fails, Reinforced Plastics, Sep. 1993, pp. 1–6.

Melby, E. G. and Castro, J. M., in Comprehensive Polymer Science, Chap. 3, 7, Pergamon Press, Oxford, UK, 1989, pp. 51–109.

*Primary Examiner*—Samuel A. Acquah
*Attorney, Agent, or Firm*—Calfee, Halter & Griswold

[57] ABSTRACT

An unsaturated polyester resin and low profile additive containing diketo groups.

3 Claims, 10 Drawing Sheets

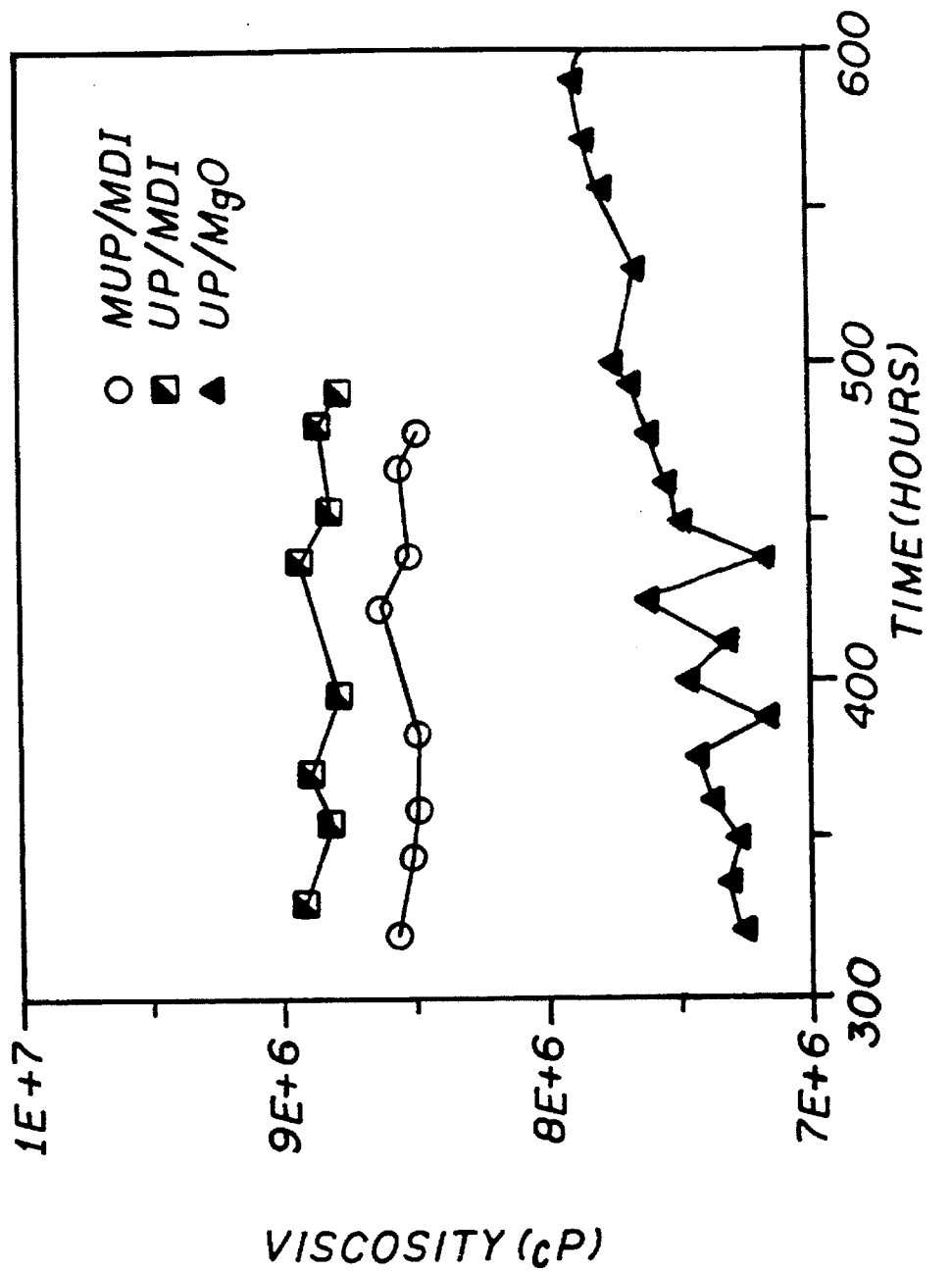

MODIFICATION OF UNSATURATED POLYESTER RESINS FOR VISCOSITY CONTROL

This is a continuation of application Ser. No. 08/324,426 filed on Oct. 14, 1994 now abandoned.

FIELD OF THE INVENTION

The present invention relates to unsaturated polyester resins and low profile additives.

BACKGROUND OF THE INVENTION

Unsaturated polyester (UP) resins are one of the most widely used thermoset pollers. Their major applications are composite products manufactured by compression molding in the form of sheet molding compounds (SMC) or bulk molding compounds (BMC), injection molding in the form of BMC, resin transfer molding (RTM), casting, and hand lay-up. Because of their light weight, high strength and non-corrosive nature, unsaturated polyester resins have replaced sheet metal in many applications, particularly in the automotive, electric and home appliance industries.

Unsaturated polyester resins are typically made by reacting an unsaturated dicarboxylic acid or anhydride, such as maleic anhydride or fumaric acid, with a polyol such as propylene glycol to form a low molecular weight unsaturated polyester resin (LMWUPR). For SMC and BMC applications, such LMWUPR's are generally thickened for easy handling and good fiber carrying characteristics during mold filling.

Chemically, thickening or "maturation" occurs by linking various LMWUPR molecules together to form poller chains of considerably higher molecular weight. Typically, this is done by adding to the system a di- or multi-functional compound which couples two or more polyester molecules together via their terminal hydroxyl and/or carboxyl groups. Because, the LMWUPR molecules usually contain more than two functional groups, the actual product formed is more typically a complex network of interconnected polymer chains rather than discrete individual chains.

Compounds used for thickening LMWUPR's are known in the art by various terms such as "thickness", "thickening agents" and "maturation agents." Essentially two types of compounds are used for this purpose. One type comprises Group IIA metal oxides and hydroxides. MgO is the most common agent of this type. It is now well accepted that maturation with this type of agent occurs via formation of ionic bonds through the reaction of MgO or analogue with the carboxylic acid end groups of the polyester molecule.

The other type of maturation agent is diisocyanate. Diisocyanates operate by forming covalent bonds, specifically urethane linkages, with the terminal hydroxyl groups of the polyester molecule.

Each type of maturation agent has its own advantages and disadvantages. For example, it is desirable that viscosity increase occur very rapidly during maturation and further that viscosity remain stable for extended periods of time once maturation is completed. Diisocyanate maturation agents exhibit this desirable property, but MgO-type maturation agents do not. Moreover, MgO-type maturation agents are very sensitive to humidity after maturation, whereas diisocyanates are not.

On the other hand, it is desirable during molding that the UPR resin exhibit good material flow. This facilitates complete filling of the mold as well as complete wetting of the filler and other ingredients in the system by the UPR. The ionic bonds formed when MgO-type maturation agents are used weaken at the elevated temperatures encountered in molding. This results in reduced compound viscosity and hence the desired material flow. The covalent bonds formed with isocyanate type thickeners, however, do not weaken at molding temperatures and hence material flow is more difficult.

It is well known that molded articles made with conventional UPR resins often exhibit poor surface finish. This is believed due to the fact that UPR's shrink somewhat as a result of the molding operation. To deal with this problem, it is also well known to add to the system (i.e, the total composition including both the UPR and all other ingredients) certain ingredients known as low profile agents (LPA). Although LPA's are effective, good material flow during molding is still necessary to obtain finishes of the highest quality. The reduced material flow encountered when diisocyanates are used as thickeners reduces LPA effectiveness in these systems, which in turn may lead to significant finish problems.

Attempts have been made to develop UPR systems whose viscosity profile exhibits all of the above beneficial properties, namely rapid increase during maturation, long term stability and significant viscosity reduction during molding. For example, one proposal has been to use both MgO type and diisocyanate type thickeners in the same system. See Melby, E. G. and Castro, J. M., 7, Ch. 3 *Comprehensive Polymer Science*, Pergamon Press, Oxford, UK (1989), the disclosure of which is incorporated herein by reference. To date, however, such systems have not been found effective as a practical matter.

Accordingly, it is an object of the present invention to provide a new UPR system which exhibits the rapid and stable thickening properties of a diisocyanate-thickened UPR system but which, at the same time, exhibits the reduction in viscosity and hence good material flow at molding conditions exhibited by UPR systems thickened with MgO type maturation agents.

In addition, it is another object of the present invention to provide novel components of UPR systems, in particular novel modified low molecular weight unsaturated polyesters and novel low profile additives, which can be used either individually or together to form the above UPR systems.

In addition, it is a still further object of the present invention to provide a novel technique for formulating specific UPR systems which allows the desired viscosity profile to be imparted to the system, even though the specific components thereof vary widely.

SUMMARY OF THE INVENTION

These and other objects are accomplished by the present invention in accordance with which diketo functional groups are incorporated into the molecules of the uncured unsaturated polyester resin system.

The diketo functional group has a decomposition temperature essentially the same as or only slightly below the temperatures achieved in most UPR molding operations. Accordingly, when a UPR system incorporating diketo groups is heated during molding, the diketo groups decompose. This results in a severing of at least some of the chemical linkages bonding together various parts of the thickened polymer network which, in turn, causes the network to be subdivided into smaller segments. The net result is that the viscosity of the UPR mass decreases, and hence the desired amount of material flow is realized. Moreover, this result is realized even if a diisocyanate is used as the maturation agent, since an MgO-type maturation agent is no longer relied on to provide the desired viscosity decrease function.

Thus, in accordance with the present invention diketo groups instead of MgO type thickeners are relied on to provide the desired property of viscosity reduction during molding. As a result, diisocyanate thickeners, alone or in combination with MgO-type thickeners, can still be used to provide their beneficial properties of rapid viscosity increase upon maturation and long term viscosity stability. Thus, both sets of beneficial properties can be provided in the same UPR system very easily. Moreover, by varying the manner and amount of diketo group incorporated into the system, as well as the relative portion of diisocyanate versus MgO type maturation agent used in the system, the viscosity profile of the system can be tailored as desired, even if significantly different types of polyol, unsaturated acid/ester, LPA's and other components are used in a particular application.

BRIEF DESCRIPTION OF THE DRAWINGS

The present invention is more thoroughly illustrated in the drawings wherein.

DETAILED DESCRIPTION

Figure 1A:
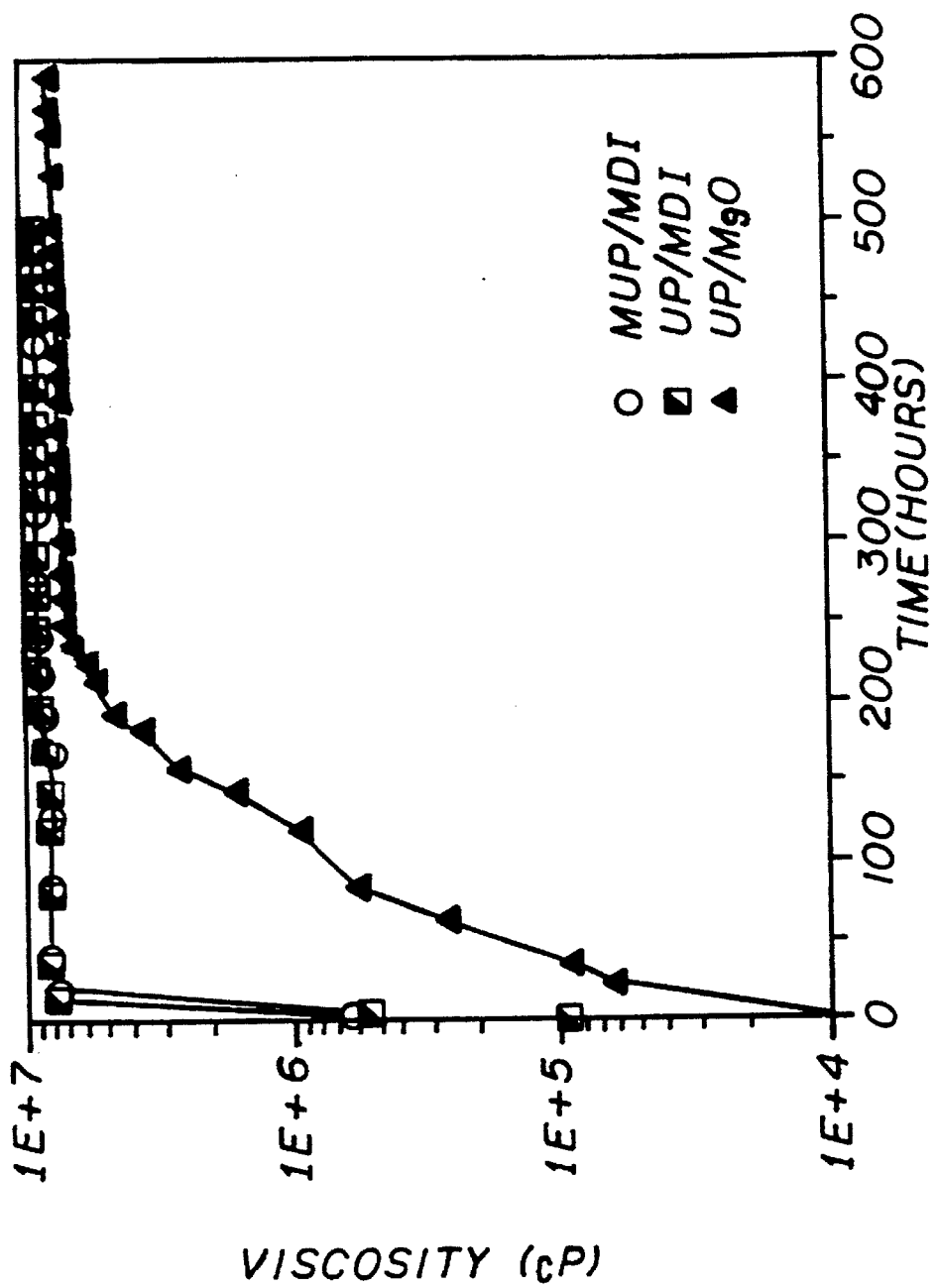
FIG. 1 is a graph comparing the viscosity profiles during maturation of a UPR system produced in accordance with the present invention with two UPR systems of the prior art, one of which uses MgO as the thickener and the other of which uses methyl diisocyanate as the thickener.

In accordance with the present invention, diketo groups are introduced into the uncured molecules of the UPR system in such a way that decomposition of the diketo bond in response to the heat encountered during molding severs the long chain high molecular weight polyester molecules of the UPR into shorter chain lengths. This in turn, causes a reduction in system viscosity and hence allows better material flow during the molding operation.

There are a number of different ways that diketo groups can be introduced into the molecules of the UPR system in accordance with the present invention. For example, the diketo group can be inserted directly into the uncured UPR molecule. Alternatively, in systems in which an LPA is chemically bonded to the polyester chains via terminal functional groups on the LPA, the diketo group can be inserted into the portion or linkage of the LPA molecule bonding to the polyester molecules. Regardless of which way the diketo group is incorporated into the non-cured UPR system, the result will be to allow viscosity reduction and hence improvement of material flow and hence shrinkage control during molding, even when diisocyanates are used as the maturation agent.

Diketoglonic Acid

An easy way to incorporate the diketo group into the UPR system in accordance with the present invention is by the use of diketoglonic acid. This compound can be easily produced by reacting ascorbic acid with hydrogen peroxide in aqueous solution at room temperature. This synthesis is described in Penney, J. R. Zilvz, S. S., *Biochem J.*, 39, 1 (1945). The reaction mechanism is illustrated in Reaction (1) below:

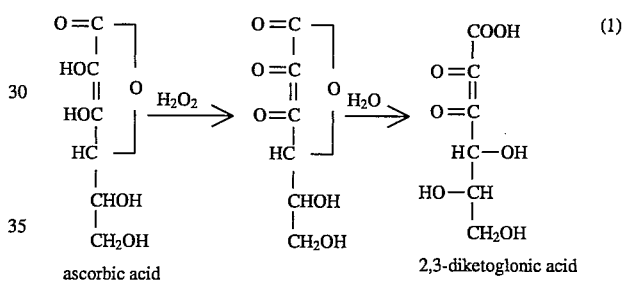

As can be seen from the above, 2,3-diketoglonic acid contains a carboxyl group on one side of the diketo group and three hydroxyl groups on the other side of the diketo group. With this arrangement of functional groups on opposite sides of the diketo moiety, the compound can be inserted between different units in an otherwise conventional UPR system to thereby provide the diketo group as an integral, internal linkage in the UPR molecules.

In accordance with the invention, compounds other than 2,3-diketoglonic acid can also be employed as the source of the diketo groups. So long as the diketo compound has at least two functional groups, with at least two of these functional groups being separated by the diketo linkage, it can be used. Of course, compounds which introduce functional groups which interfere with the desired chemistry of the other ingredients of the system should be avoided. Whether a particular diketo compound can be used in a particular application can easily be determined by routine experimentation. In any event, 2,3-diketoglonic acid is preferred because it is inexpensive and easily prepared from readily available reactants.

Modified Unsaturated Polyester Resins

Incorporating a diketo group directly into the polyester molecule of a UPR system using 2,3-diketoglonic acid or analogue can be done in a variety of different ways. Perhaps the easiest way to do this is to attach a unit containing the diketo group in its interior to the terminal carboxyl groups of a conventional LMWUPR as received from the manufacturer. This can easily be accomplished by reacting a conventional LMWUPR having terminal carboxyl groups with a diamine such as 1,6-hexanediamine to couple the diamine to the LMWUPR via an amide linkage and thereafter reacting the amine group on the other end of the diamine with 2,3-diketoglonic acid.

This synthesis is illustrated below in the following Reactions (2) and (3).

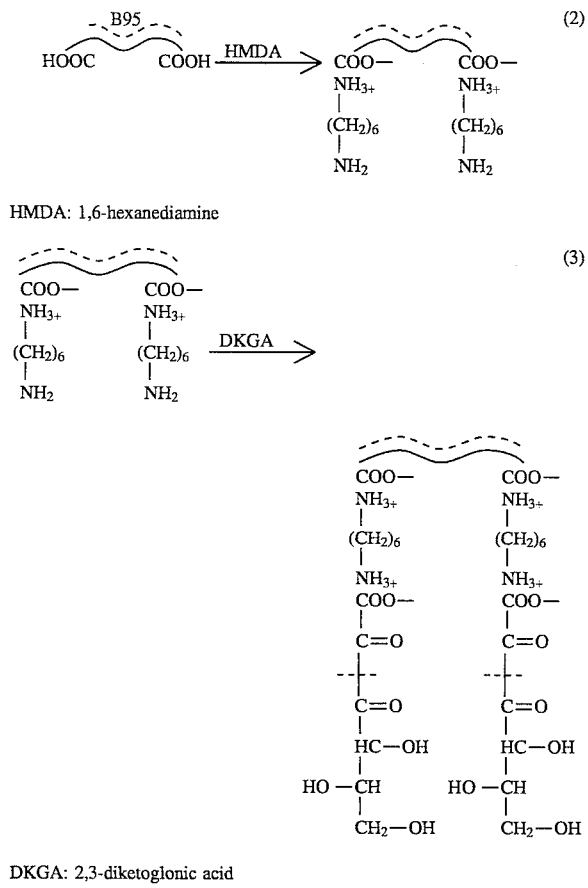

HMDA: 1,6-hexanediamine

DKGA: 2,3-diketoglonic acid

Both of these reactions are simple amide formation reactions and can be easily accomplished by mixing the compounds together at room temperature until the reaction is completed.

In this synthesis, many other types of diamines can be used instead of 1,6-hexanediamine. For example, p-xylylenediamine and 1,4-butyldiamine can be used. Indeed, basically any other diamine can be used so long as the functionality described above is not adversely affected. Moreover, dipyridino compounds can also be used. Examples of suitable dipyridino compounds are 1,2-bis(4pyridyl)ethane, 1-2-bis(2-pyridyl)ethane, 1,2-bis(4-pyridyl)butane.

In this regard, it will be readily understood that the purpose of the diamine or dipyridino compound is to enable easy attachment of the 2,3-diketoglonic acid group to the terminal carboxyl group of the LMWUPR in such a way that the diketo group is preserved and at the same time at least one hydroxyl group on the opposite side of the diketo group is preserved for subsequent reaction with the maturation agent. In accordance with the invention, any di- or multi-functional amine or pyridino compound, and indeed any analogue of 2,3-diketoglonic acid including those having terminal carboxyl groups in place of or in addition to the terminal hydroxyl groups on the opposite end of the molecule, can be used so long as this basic functionality is not lost. Determination of which particular multi-functional amine or pyridino compound and which particular diketo compound should be used in a particular application depends on the other components in the system as well as the desired operating properties of the target system. This can easily be determined through routine experimentation, keeping in mind the above constraint as to the basic purpose and function of the diamine and the diketo groups.

For example, it has been found that the modified unsaturated polyesters (MUP) produced as described above from 1,6-hexanediamine exhibits a comparatively low compatibility with styrene. This is believed due, at least in part, to the fact that 1,6-hexanediamine is not very soluble in styrene. The strong hydrogen bonding contributed by the six hydroxyl groups of the MUP is also believed to reduce styrene compatibility. In accordance with the invention, styrene compatibility can be improved by using components and making adjustments which make the resultant MUP more oleophillic.

For example, aromatic diamines such as p-xylylenediamine can be used to replace 1,6-hexanediamine in the synthesis since such compounds are more oleophillic than 1,6-hexanediamine. Furthermore, to reduce the hydrogen bonding effect, some of the terminal hydroxyl groups can be capped with suitable organic agents. For example, phenyl isocyanate can be used to cap some of these hydroxyl groups. In any event, selection of the particular MUP to use in a particular application depends on the other components in the system and can easily be determined by routine experimentation.

The foregoing technique of incorporating a diketo group into the UPR molecule by amidation with a diamine or analogue followed by amidation with 2,3-diketoglonic acid is particularly useful for LMWUPR molecules whose terminal functionality comprises carboxyl groups. Should a particular LMWUPR molecule exhibit other types of terminal functionality, then other techniques can be used to incorporate the diketo group into the polymer molecule.

For example, if a particular LMWUPR includes terminal amino or pyridino groups, then the first step of the above synthesis, amidation with a diamine or analogue, can be eliminated and the diketo group incorporated by reacting the amino- or pyridino-terminated LMWUPR directly with 2,3-diketoglonic acid or analogue. In the same way, LMWUPR terminated with epoxy functional groups can be reacted directly with 2,3-diketoglonic acid or analogue for imparting the diketo group to the molecule. However, in this case the majority of 2,3-diketoglonic acid moieties would attach to the UPR via the hydroxyl rather than the carboxyl group of the diketoglonic acid molecule because of the preferential affinity of epoxy functionality for hydroxyl rather than carboxyl groups. In a similar way, a diexpoxy compound such as the diglycidyl ether of Bisphenol-A could be used in place of a diamine for attaching a functional group (i.e., an epoxy) to a LMWUPR molecule for subsequent reaction with 2,3-diketoglonic acid. Such a synthesis would be particularly suitable for UPR's whose major functionality is hydroxyl instead of carboxyl. In any event, there is no restriction in accordance with the present invention on how the diketo group is incorporated into the polyester molecule. Any technique can be used which adds a diketo group to a functional group of the UPR and which also provides an additional functional group on the other side of the diketo group capable of bonding to the thickening agent intended to be used in the maturation process.

Diketo Modified Low Profile Agents

Still another way of introducing a diketo group into the UPR system, in accordance with the present invention, is to form a modified low profile additive (LPA-M) containing the desired diketo group.

As mentioned above, some types of LPA's have terminal carboxyl, hydroxyl, epoxy and/or amine groups which react to form ionic bonds with terminal carboxyl or hydroxyl groups in the UPR resin, thereby chemically attaching the LPA molecule to the UPR. In accordance with this aspect of the invention, such an LPA is reacted with a unit containing the desired diketo group to thereby form a modified LPA (LPA-M) having a diketo group in the linkage intended to connect the LPA to the polyester molecule of the UPR system.

Producing modified LPA's of this type is most easily done by the same technique described above in connection with producing modified LMWUPR molecules. For example, for carboxyl-terminated LPA's the diketo group can be easily incorporated by reacting the LPA with a diamine or dipyridine followed by reaction with 2,3-diketoglonic acid. This synthesis is the same as illustrated in the above Reactions (2) and (3), except that the LPA forms the backbone of the molecule reacted instead of the LMWUPR molecule. Also, in this case, the LPA does not necessarily require multiple carboxyl groups, although as a practical matter multiple carboxyl will be present. As in the case of Reactions (2) and (3) above, the reactions involved in this synthesis also are simple amidation reactions which can be easily carried out by mixing the reactants together, with stirring, at room temperature until the reaction is completed.

For LPA's terminated with hydroxyl, amino and epoxy functional groups, the other techniques described above in connection with adding diketo functionality to LMWUPR's containing the hydroxyl, amino and epoxy functionalities can be used.

A particular advantage of the modified LPA's of this aspect of the present invention is that they can be used to enhance shrinkage control and hence surface finish of the molded products ultimately produced. Attaching the LPA to the UPR molecule in such a way that this linkage breaks during molding allows the UPR and LPA to readily form the dissimilar phases that are necessary for good shrinkage control. At the same time, reliance on diketo groups instead of an MgO-type maturation agent to provide the property of good material flow during molding allows a diisocyanate to be used as the maturation agent, either alone or in combination with others, thereby providing the desired rapid viscosity increase and long term stability made possible by these compounds. As a result, a UPR system can be produced which not only exhibits rapid viscosity increase, long term viscosity stability and good material flow during molding, but also makes possible the production of molded articles having excellent "Class A" finishes, as desired.

Other System Components

The present invention is applicable to all UPR systems in which low molecular weight unsaturated polyester molecules are polymerized into higher molecular weight polyester chains which, in turn, are then reacted during molding via their ethylenic unsaturation to form cross-linked matrices. As well appreciated by those skilled in the art, particular components of such systems, in particular, the identities and amounts of the dicarboxylic acid and/or anhydride and the polyol can vary widely. The present invention is applicable to all such systems, there being no restriction on the type or amount of unsaturated carboxylic acid and/or anhydride or polyol from the invention.

In the same way, UPR systems used in practice today contain many other components in addition to the unsaturated polyester resin. For example, most such systems contain a significant amount of other ethylenically unsaturated comonomer for incorporation into the system by addition polymerization during the curing reaction. Examples of such comonomers are styrene, methyl methacrylate, dimethyl styrene and vinyl toluene. All such comonomers can also be incorporated into the UPR systems produced in accordance with the present invention.

Another conventional ingredient oftentimes included in UPR systems, as described above, are low profile agents (LPAts). As described above, low profile additives having terminal carboxyl, amine, epoxy, pyridino or hydroxyl groups can be used to particular advantage in accordance with the present invention. In addition, however, any other material used as an LPA can also be used for this purpose in the UPR systems of the present invention. Examples of such materials are polyethylene, polystyrene, saturated polyesters, polymethyl methacrylate, saturated polyester urethanes, styrene butadiene copolymers and so forth.

Other well known components in unsaturated polyester resin systems are carrier resins, inhibitors, catalysts, mold release agents, pigments and fillers such as fiberglass, chopped glass roving, particulate materials such as calcium carbonate, etc., and so forth. All such materials can also be included in UPR systems produced in accordance with the present invention.

Relative Proportion of Diketo Group

There is no real limit on the amount of diketo group that can be incorporated into a particular UPR system in accordance with the present invention. Essentially any amount can be used.

In practice, the amount of diketo group to be incorporated into a particular system depends on many factors including the amounts and identities of the LMWUPR used, the amount of branching in this LMWUPR and the desired amount of branching in the target thickened UPR system, the identity and amount of the maturation agent, the identity and amount of the other components such as fillers, extenders, etc., the type of initiator and the anticipated molding temperature, and most significantly the desired amount of material flow during curing to be exhibited by the product UPR. Once all these considerations are taken into account, one skilled in this art can easily determine by routine experimentation the precise amount of diketo group to incorporate into a particular system as well as to achieve the desired viscosity profile of the product UPR.

WORKING EXAMPLES

The following working examples are provided to more thoroughly illustrate the present invention:

I. UPR SYSTEMS INVOLVING DIKETO-MODIFIED LOW MOLECULAR WEIGHT UNSATURATED POLYESTER RESIN MOLECULES

A series of experiments was conducted in which a modified unsaturated polyester resin containing diketo linkages (MUP) was first produced, thereafter this MUP was thickened with various thickening agents, and finally this thickened MUP was cured. The rheological properties of the system were monitored during thickening and also during subsequent curing.

EXPERIMENTAL

Materials

The unsaturated polyester resin used in these experiments was supplied by Cook Composites and Polymers under the designation (B95). B95 resin comprises polymerized maleic anhydride and propylene glycol having carboxyl groups on both ends. It has a number average molecular weight of 1500 and an average of 9.5 C=C bonds per UP molecule. Styrene (ST) (Aldrich Chemical) was used as received. In experiments in which higher molding temperatures were involved, TBP (t-butyl peroxybenzoate, Atochem) with a molecular weight of 194, an activation energy of 33.0 kcal/mole, and a half life at 101° C. of 10 hours was used as the initiator. At lower temperatures, PDO (t-butyl peroxy-2-ethyl hexanoate, Atochem) with a molecular weight of 216, an activation energy of 34.0 kcal/mole, and a half life at 77° C. of 10 hours was used as the initiator.

Synthesis of Modified Unsaturated Polyester (MUP)

The B95 resin was dissolved in dichloromethane (DCM) to form a 33 wt. % polymer solution. Next, 1,6-hexanediamine was added such that the molar ratio of amine groups to carboxyl groups in the polymer solution was 2.2. The solution was then stirred continuously for half an hour until the solution turned basic (i.e., pH value of about 9). The reaction scheme is shown in Reaction (2) above.

Ascorbic acid was used to synthesize 2,3-diketoglonic acid in accordance with the reaction scheme illustrated in Reaction (1) above. An aqueous solution of 33% ascorbic acid was reacted with hydrogen peroxide overnight at room temperature to form the 2,3-diketoglonic acid.

To produce the desired modified UP, the aqueous solution of 2,3-diketoglonic acid was added to the foregoing amine-ended (B95) polyester solution to a molar ratio of 1 to 1. The composition was stirred for about 2 hours at room temperature until the solution turned neutral. The final product was found to be a mixture of modified UP, dichloromethane, and water. The solution was then placed under vacuum at about 35° C. until all the solvents were evaporated. The dried polymer was checked by a differential scanning calorimeter (DSC 2910, TA Instruments) and a Fourier transform infrared spectrometer (Model 20 DX spectrometer, Nicolet) to make sure that there was no solvent left.

The modified UP resin based so made was found to have a low compatibility with styrene. The maximum styrene concentration in the resin styrene mixture was 43 wt. %, i.e., the maximum molar ratio of styrene to C=C bonds of this modified UP was 1.5. This is believed due to the fact that 1,6-hexanediamine is not very soluble in styrene. Strong hydrogen bonding contributed by the six hydroxyl groups of the modified UP is also believed to reduce styrene compatibility. Another major drawback of this modified UP was that the viscosity drop of the thickened resin produced upon heating using this MUP was small. This, again, was due to the presence of a large number of hydroxyl groups which tended to form a highly branched polymer when the resin was thickened with diisocyanates.

In order to solve these problems, additional MUP's were prepared in which several changes were made. First, an aromatic diamine, p-xylylenediamine, was used to replace 1,6-hexanediamine. With this aromatic diamine, the compatibility of the modified UP and styrene was greatly improved. A molar ratio of 2 between styrene and C=C bonds of the modified UP could be easily achieved. To reduce the hydrogen bonding effect, phenyl isocyanate was used to cap some of the hydroxyl groups of the modified UP resin. A test was done for capping one, two, and four hydroxyl groups. The capping process was carried out after the modified UP was dissolved in styrene. The viscosity of the resin did not change considerably when one hydroxyl group of the modified UP was capped. When two or four hydroxyl groups were capped, the viscosity of the resin reduced greatly. However, capping four hydroxyl groups of the modified UP molecule tended to reduce the thickening activity too much, and consequently, the maturation process with diisocyanates became very long (more than 50 hours). Therefore, capping two hydroxyl groups of the modified UP was chosen for further experimentation. The final version of the modified UP (MUP) was dissolved in 50 wt. % of styrene to make the molar ratio of styrene to C=C bonds of the MUP equal to two. Capping some of the hydroxyl groups also improved the solubility of the MUP in styrene. The foregoing reactions, i.e. formation of the p-xylxylenediane substituted intermediate, formation of the diketo modified intermediate and capping, as well as the final chemical structure of this MUP, are illustrated below in the following Reactions (4), (5) and (6):

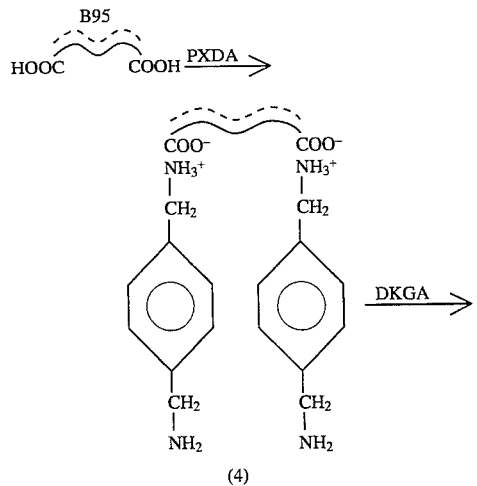

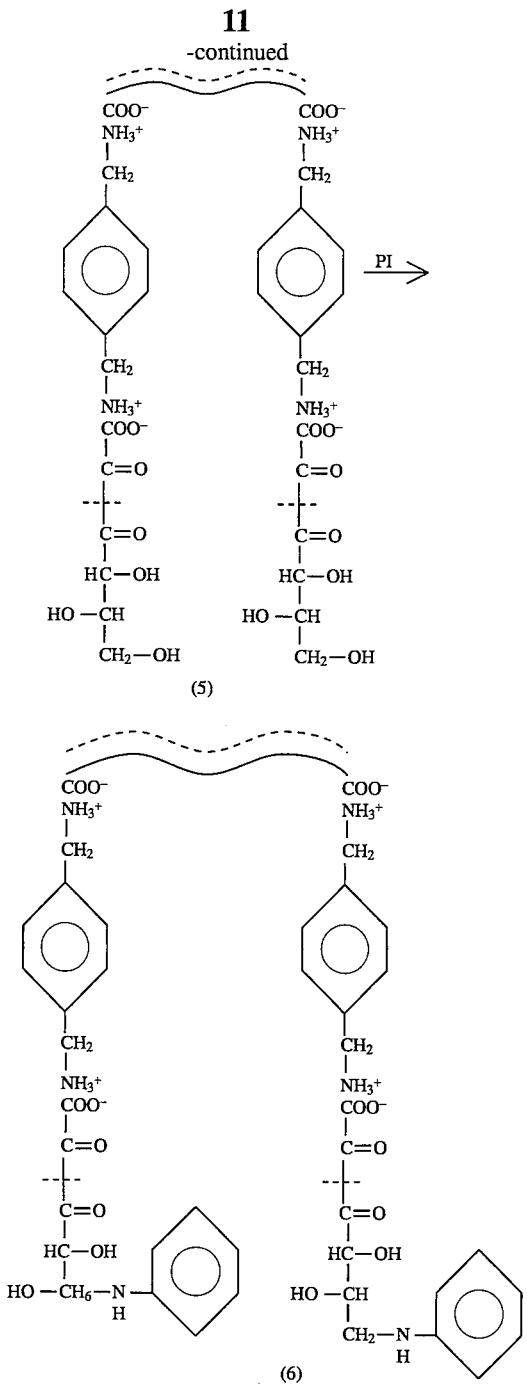

PXDA: p-xylylenediamine
DKGA: 2,3-diketoglonic acid
PI: phenyl isocyanate

Preparation of Thickened Resin

The above MUP made with p-xylylenediamine, having two hydroxyl groups capped with phenyl isocyanate and mixed with 50% styrene, as well as the conventional, unmodified polyester, were used to prepare a number of different thickened UPR systems. In each system, a formulation comprising either the modified polyester (MUP), the unmodified polyester (UP) or both in styrene was thickened with 1.5 wt. % of MgO or 3 to 8 wt. % of diphenyl diisocyanate (MDI) at room temperature. The molar ratio of styrene to the C=C bonds of the UP resin was always set at 2.0. Also, in order to inhibit polymerization in those experiments in which curing was to be avoided, 0.5 wt. % of benzoquinone was added to the resin samples. In the other experiments, a polymerization initiator was added which was 1 wt. % of PDO for 110° C. curing and 1 wt. % of TBP for 150° C. curing.

The following Table 1 lists the amounts of the different polyesters and the amount of styrene in the formulations used to prepare the thickened systems.

TABLE 1

Composition of the Polyester/Styrene
Formulations Used in Making Up Specific UPR Systems

| Sample # | UP/MUP weight ratio | UP, wt % | MUP, wt % | ST, wt % |
|---|---|---|---|---|
| 1 | 100% UP | 43.2 | 0.0 | 56.8 |
| 2 | 70% UP 30% MUP | 31.5 | 13.5 | 55.0 |
| 3 | 60% UP 40% MUP | 27.4 | 18.3 | 54.3 |
| 4 | 100% MUP | 0.0 | 50.0 | 50.0 |

Viscosity Measurement

Viscosity change during maturation as well as upon subsequent heating of various UPR systems made with the above formulations was monitored by a Brookfield viscometer (RVDT, DV-I+ Viscometer, Brookfield Engineering Laboratories Inc.) with spindle No. 6 and/or No. 7 at 0.5 rpm speed. Each sample was loaded in a glass tube (25 mm in diameter). For heating, the test tube with the thickened resin sample was placed in an oil bath whose temperature was set at 150° C.

A rheometer developed by Rheometrics, Inc. (a modified RDA II) in the steady shear mode was used to evaluate the rheological changes of the UPR systems under various shear rates. Viscosity was measured with the samples being heated from room temperature to 110° C. A pair of serrated aluminum parallel plates, 7.9 mm in diameter, was used as a sample cell. The gap between the two plates was set at 1.1 mm. Experiments were conducted at different shear rates ranging from 0.01 to 10 sec$^{-1}$.

Reaction kinetics were measured by the differential scanning calorimeter at the rate of 10° C. per minute. The tests were conducted in volatile aluminum sample pans capable of withstanding at least 2 atmospheres internal pressure after sealing. The reaction was carried out in the scanning mode from room temperature to 200° C. at a heating rate of 10° C./min.

RESULTS AND DISCUSSION

Characterization of Modified UP

DSC of the above modified UP resin made with p-xylylenediamine and capped by phenylisocynate showed that an endothermic peak appeared from 88° C. to 133° C. This indicates a bond breaking in that temperature range. The endothermic peak did not reappear upon a second scan of the same sample. For further verification, the same experiment was carried out on the unmodified UP resin and the result showed that there was no endothermic peak. Based on these observations, it is concluded that a thermally breakable bond was introduced onto the modified UP resin and that the decomposition temperature of this bond is about 110° C. The structure change of this MUP before and after modification was also confirmed by FT-IR.

It was also observed by DSC that bond breakage temperature was affected by maturation. In particular, it was observed that the endothermic peak was broadened and the peak was delayed by adding the thickener. This may be explained by the increase of molecular weight of the thickened UP system.

Maturation Process

The ideal thickening behavior of a UP resin system would be for the system to reach saturated viscosity fast and remain stable afterwards. Generally, diisocyanate thickened UP systems exhibit such behavior. FIG. 1 shows the comparison of the viscosity profile during maturation of a prior art UP/ST system thickened with MgO or MDI, and the MUP/ST system of the present invention thickened with MDI. The specific systems compared in this figure are 100% MUP/ST/3% MDI, 100% UP/ST/8% MDI and 100% UP/ST/1.5% of MgO.

As shown in FIG. 1, for the UP/ST/MgO system, the viscosity increased gradually, taking more than 200 hours to reach $7.0 \times 10^6$ cP. After that, viscosity increased slowly and tended to fluctuate. On the other hand, viscosity increase for the prior art system based on MDI was much faster and, moreover, resin viscosity remained stable after thickening. This is because the urethane linkages formed are stable.

As further shown in FIG. 1, the modified UP resin made in accordance with the present invention and thickened with MDI resulted in the same thickening behavior as the UP/ST/MDI system. However, the amount of MDI needed for reaching the same saturated viscosity was different. To obtain a saturated viscosity of $8.5 \times 10^6$ to $9 \times 10^6$ cP, the unmodified UP/ST system required 8 wt. % of MDI, i.e., the molar ratio of the isocyanate group to the carboxyl group was 1.15, while only 3 wt. % of MDI was needed for the MUP/ST system, i.e., the molar ratio was 0.25. This difference is due to the introduction of multiple hydroxyl groups onto the UP molecules which tended to form highly branched polymers and thus less amount of thickener was needed to achieve the same saturated viscosity.

Viscosity Change During Heating

In order to understand the viscosity changes during heating (i.e curing) of the modified UP resin of the present invention, several thickened resin systems were compared: UP/ST/MDI, UP/ST/MgO, and three different MUP/UP/ST/MDI systems. The amount of MDI added was different in the different systems in order to have a similar saturated viscosity. Each system, however, included 1 wt. % of benzoquinone as a polymerization inhibitor.

The compositions of the specific resin systems used in this comparison as well as the results obtained are set forth in the following Table 2.

120° C. This can be explained by the different bond formation during thickening. The molecules in the MDI based system were linked by covalent bonds which are stable at higher temperatures. In contrast to this, ionic bonds were formed in the MgO based system, which became unstable at elevated temperatures. The viscosity of both systems, however, increased after about 900 seconds at which the temperature was about 110° C. This may be due to the considerable styrene evaporation and the thermally induced polymerization in the resin system, despite of the presence of benzoquinone.

Among the three MUP based samples of the present invention, viscosity decreased more as the amount of MUP increased. For the 100% MUP/ST/MDI system, sample 1, the viscosity decreased from $9 \times 10^6$ cP to $2.8 \times 10^4$ cP as the temperature increased from room temperature to 120° C. Viscosity showed a gradual drop in the beginning then a sharp change around 95° C. which indicates that the diketo groups started to break. When the temperature was further increased, the lowest viscosity was reached at 108° C. After that, viscosity started to increase owing to the evaporation of styrene and thermally induced polymerization of MUP/ST. The starting and the lowest viscosities of the 40%MUP/60%UP/ST/MDI system, sample 2, and the 30%MUP/70%UP/ST/MDI system, sample 3, were $8.2 \times 10^6$ cP to $5 \times 10^4$ cP and $9.1 \times 10^6$ cP to $1 \times 10^5$ cP, respectively. Similarly, a rate change in viscosity drop was found around 95° C. for these two samples. The lowest viscosities were found at 110° and 111° C. for these two samples.

Theoretically, resin viscosity should drop to the initial value of the unthickened material (see Table 2) if all thickened bonds were broken upon heating. However, in practice the minimum viscosities of both the UP/ST/MgO and UP/ST/MDI systems were much larger than the initial viscosities of the unthickened resins. This is believed due to the fact that in the UP/ST/MgO system, the ionic bonds between the MgO and the UP molecules may became weaker at elevated temperatures. However, not all of the bonds broke. Consequently, the minimum viscosity reached during heating was much higher than the initial viscosity of the unthickened resin. For the 100%MUP system, the lowest viscosity, $2.8 \times 10^4$ cP was slightly higher than the unthickened value, $1.3 \times 10^4$ cP. This indicates that although most thermally breakable bonds were broken, there were still some larger molecules formed, perhaps from the urethane linkage of MDI and the hydroxyl groups of the MUP molecules.

TABLE 2

Comparison of viscosity changes.

| UPR System Number | UP, wt % | MUP, wt % | Thickener, wt % | $\mu$(cP) unthickened | $\mu_s$(cP) starting | $\mu_m$(cP) minimum | $\mu_s/\mu_m$ ratio |
|---|---|---|---|---|---|---|---|
| #1 | 0.0 | 100.0 | 3% MDI | 1.3E4 | 9E6 | 2.8E4 | 321.2 |
| #2 | 60.0 | 40.0 | 5% YDI | 8.2E3 | 8.2E6 | 5E4 | 164.0 |
| #3 | 70.0 | 30.0 | 6% MDI | 7.3E3 | 9.1E6 | 1Es | 91.0 |
| #4 | 100.0 | 0.0 | 1.5% MgO | 1.3E3 | 9.5E6 | 2.1E5 | 45.2 |
| #5 | 100.0 | 0.0 | 8% MDI | 1.3E3 | 1.5E7 | 3.4E6 | 4.5 |

Figure 2:
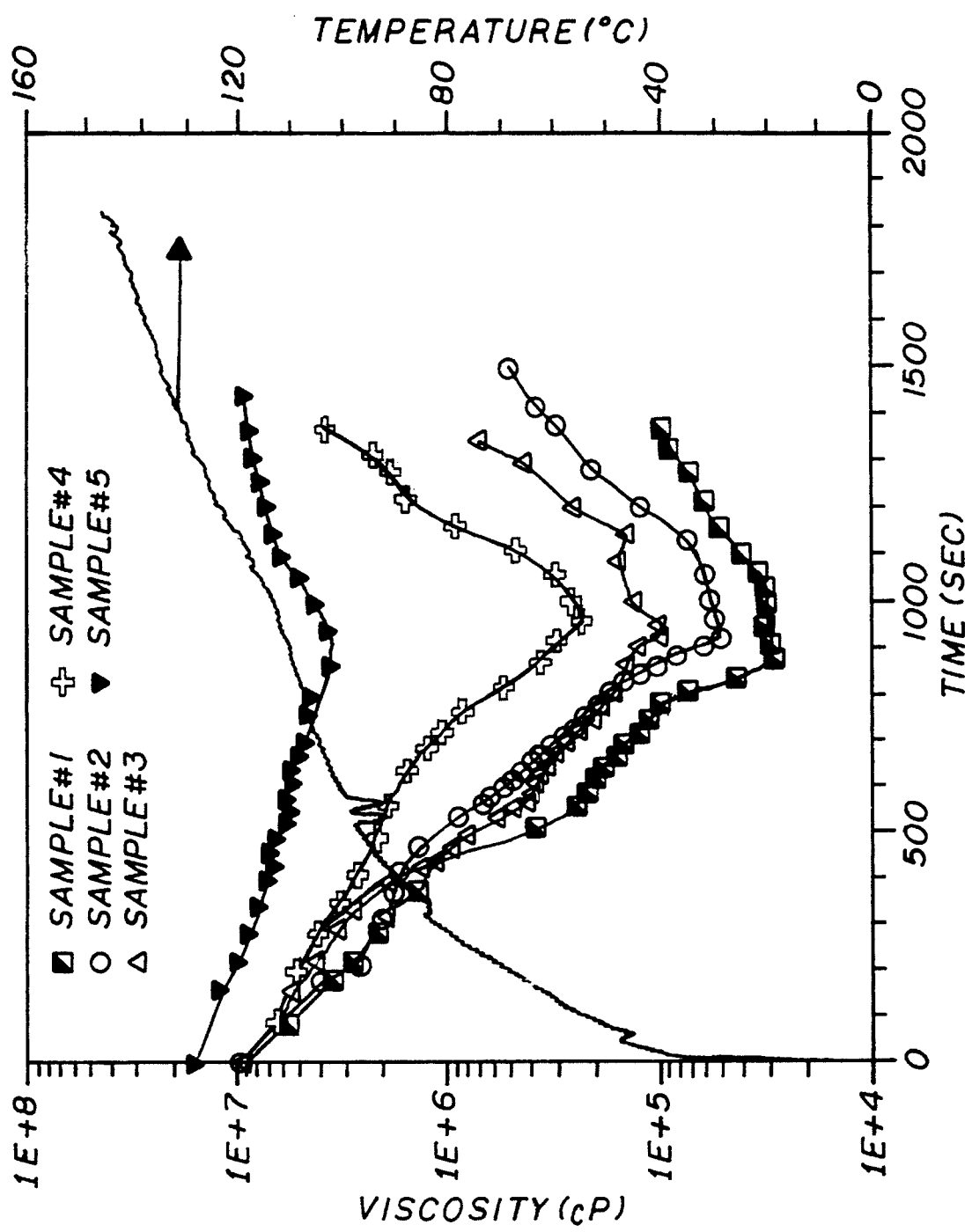
FIG. 2 is a graph illustrating the viscosity profiles of a number of modified UPR systems of the present invention during curing.
Figure 3A:
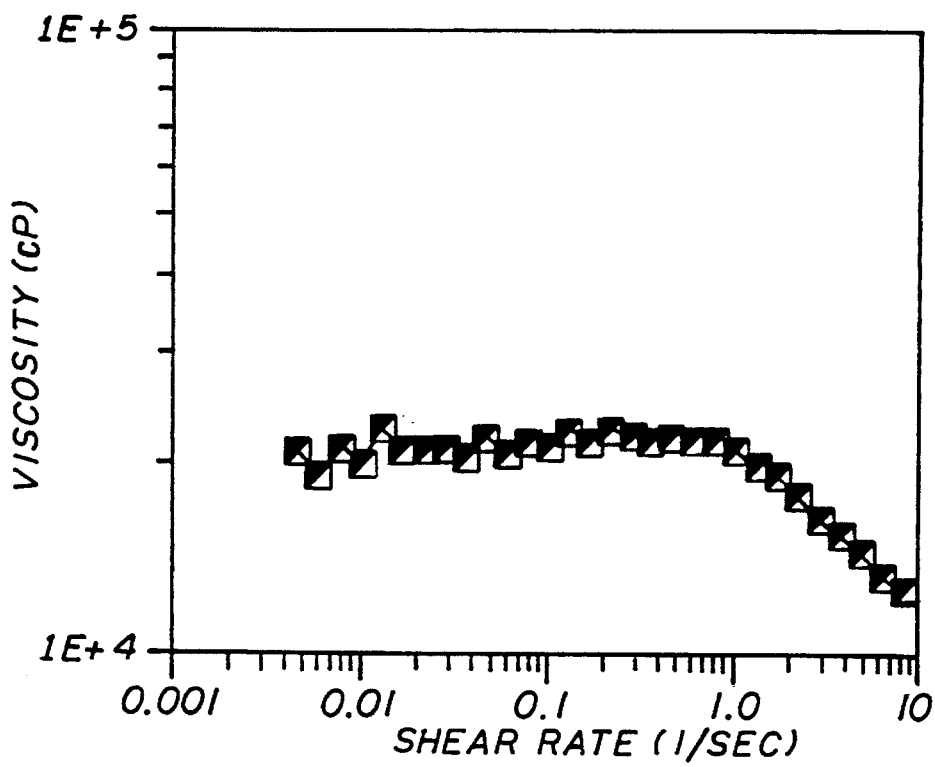
FIG. 3 is a graph illustrating viscosity of two thickened and one unthickened UPR system of the present invention as a function of shear rate.
Figure 3B:
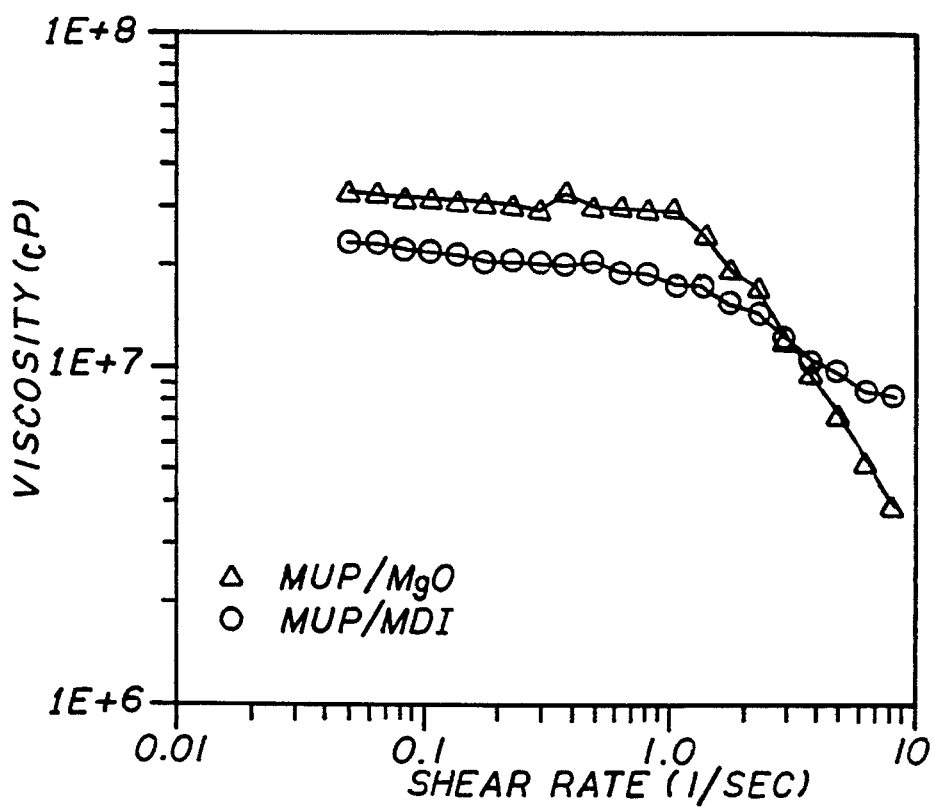

FIG. 2 shows the viscosity changes occurring during heating of these samples measured by the Brookfield viscometer. As seen in this figure, the viscosity of the UP/ST/MDI system, sample 5, was reduced slightly upon heating from $1.5 \times 10^7$ cP to $3.4 \times 10^6$ cP as the temperature was raised from room temperature to 120° C. The UP/ST/MgO system, sample 4, showed a viscosity drop from $9.5 \times 10^6$ cP to $2.1 \times 10^5$ cP when the temperature was increased from 25° to Shear Effect on Gelation of the UP System During mold filling, the UPR system is under certain shear force. The relationship between compound viscosity and gelation, on the one hand, and shear rate or shear stress on the other hand, is an important issue since UP compounds are non-Newtonian fluids which become solids during molding. FIG. 3 shows the viscosity changes of an unthickened sample and two thickened samples under different shear rates measured by RDA II at room temperature. The specific systems compared in this figure were 100% MUP/styrene for the unthickened sample and, for the thickened samples, 20% MUP/80%UP/styrene with either 1.5 wt. % MgO or 6 wt. % MDI.

All samples showed the shear thinning phenomenon. For the thickened samples using MUP in accordance with the present invention, the MDI thickened system showed less dependence on shear rate than the MgO thickened system. This is probably due to the stronger covalent bonding of the urethane linkage than the ionic bonding of MgO. Therefore, shear force would result in less influence on the MDI thickened samples than the MgO thickened samples.

Figure 4:
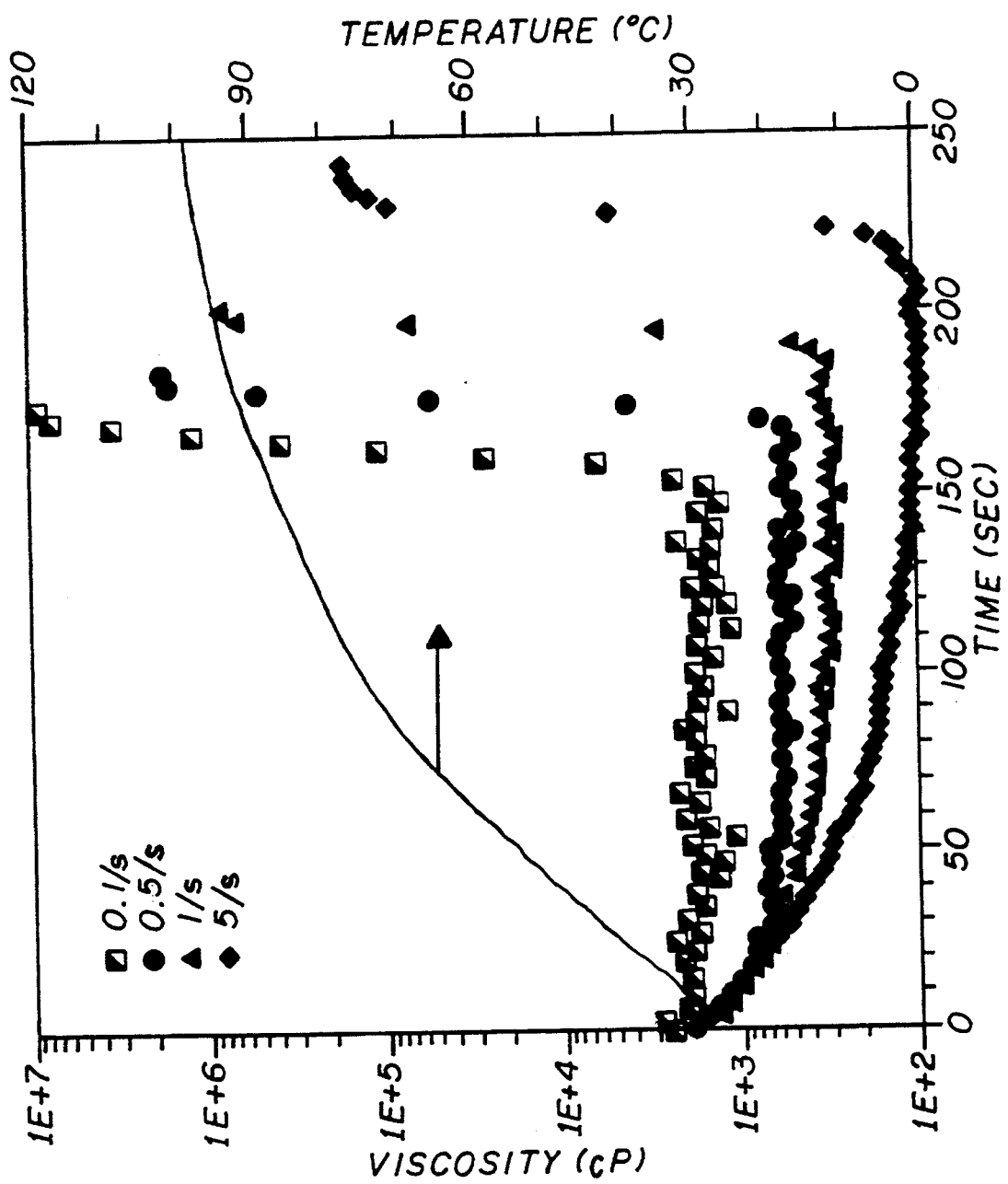
FIG. 4 is a graph illustrating the viscosity profile of an unthickened UPR system of the present invention, during curing, as a function of an applied shear stress.

FIG. 4 shows the viscosity changes during curing of an unthickened UP system (i.e. 43.2% UP/56.8%ST) at four different shear rates. The gelation time was around 160 seconds under the lowest shear rate, 0.1 sec$^{-1}$, but increased to 230 seconds when the shear rate was increased to 5 sec$^{-1}$. This implies that the unthickened compounds would have a longer flow time in a manufacturing process with higher shear rates, e.g., injection molding vs. compression molding.

This shear rate dependence of gelation time corresponds to results obtained in previous work. See, Muzumdar, S., Ph.D dissertation, The Ohio State University, 1994. In that work, it was found that the polymers formed in the reaction of UP resin and styrene had a bimodal molecular weight distribution. The smaller ones were the primary polymers formed from the radical polymerization of monomers, often referred to as 'microgels'. Because of the multi-functionality of the UP molecules, the 'microgels' had many pendant C=C bonds which made them highly reactive. The larger polymers observed are believed to be the result of polymerizations among 'microgels'. See, Chiu, Y. Y. and Lee, L. J., submitted to *J. Polym, Sci.*, Chemistry Edition. Under shear flow, the formation of the larger polymers was delayed. Because resin gelation depends mostly on the formation of larger polymers, the gelation time became longer at higher shear rates.

The relationship between viscosity change upon heating and shear rate was also investigated for MgO and MDI-thickened modified UP systems of the present invention. UPR Systems Nos. 1 and 5 of Table 2 were the particular systems investigated.

Figure 5:
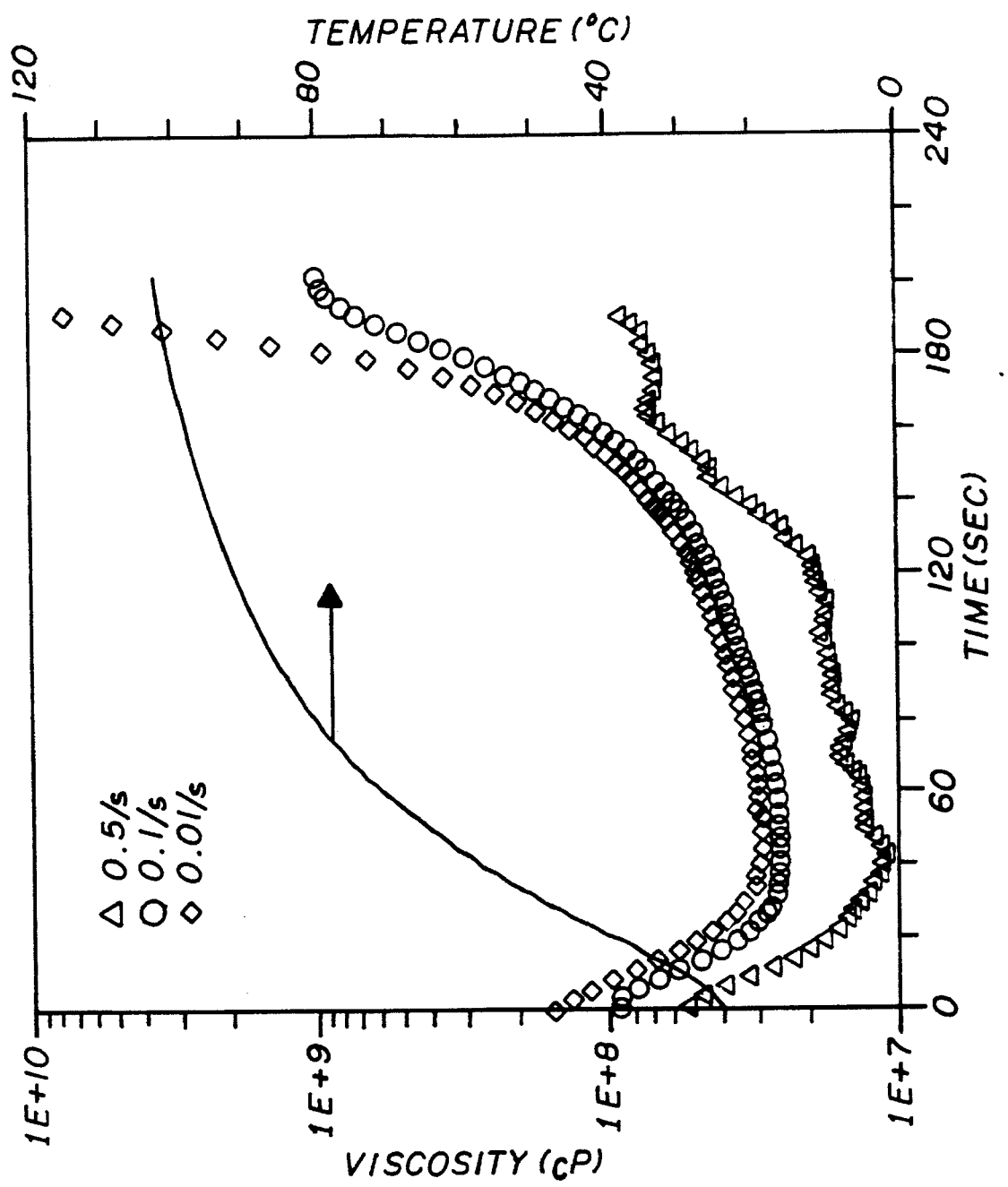
FIG. 5 is a graph illustrating the viscosity profile of an MgO-thickened UPR system of the present invention, during curing, as a function of an applied shear stress.
Figure 6:
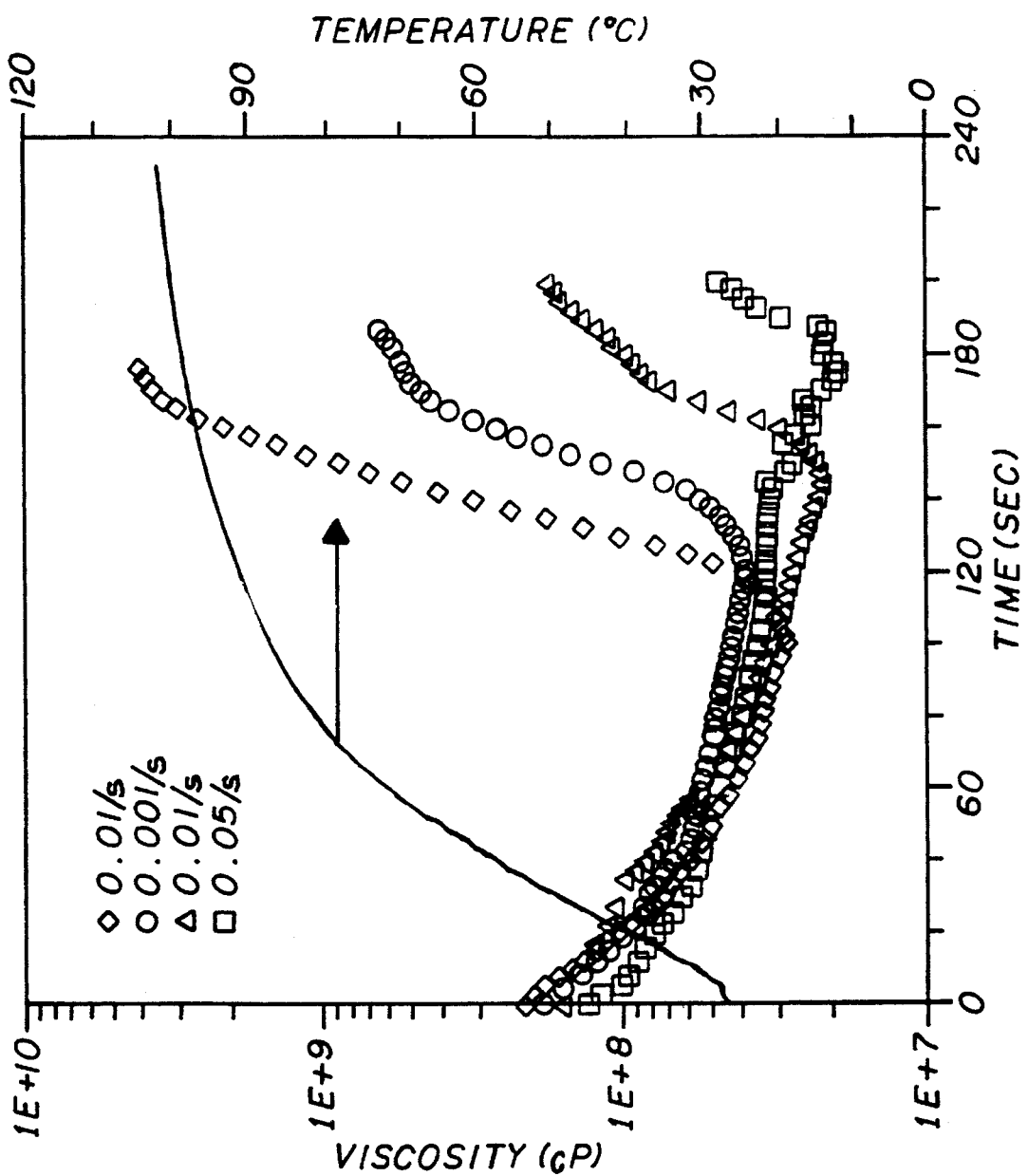
FIG. 6 is a graph illustrating the viscosity profile of a diisocyanate-thickened UPR system of the present invention as a function of an applied shear stress.

As shown in FIG. 5, the MgO thickened system did not show the same behavior, as the unthickened system. Instead, the gelation time was largely independent of shear rate. For the thickened MUP/ST/MDI system, the strong dependence of gelation time on the shear rate was observed again as shown in FIG. 6. Since the ionic bonds in the MgO thickened system would not totally break upon heating, most molecules in the system were connected during polymerization. It is believed this prevented the formation of the bimodal molecular weight distribution. Consequently, there was little shear effect on gelation time. On the other hand, the thermally breakable bonds broke at elevated temperature and released the UP molecules in the MDI thickened MUP system. Therefore, the polymer formation in this system was similar to that in the unthickened UP compound. As a result, the strong shear rate dependence of gelation time was observed in this system.

Compound Viscosity Design

Figure 7:
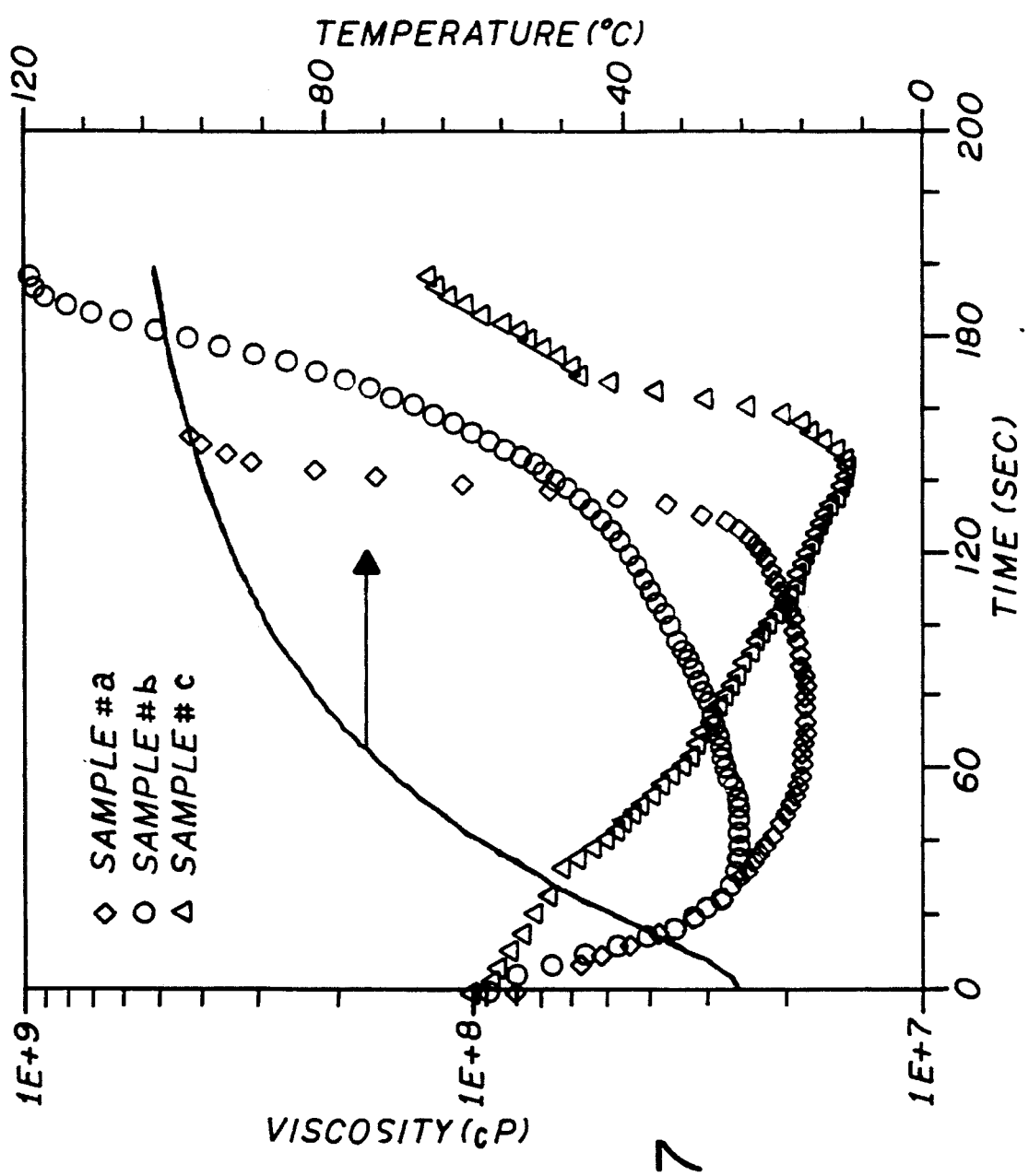
FIG. 7 is a graph illustrating variations in viscosity profile during curing made possible in accordance with the present invention by suitable selection of the thickening agent and the amount of inventive modified UPR included in the system.

With the different rheological characteristics of UP and MUP thickened by MgO or MDI as illustrated above, it is possible to design a UPR system based on a mixture of these materials to achieve a desired viscosity profile. An example is shown in FIG. 7. In this figure, the specific compositions compound are set forth in the following Table 3.

TABLE 3

Composition of Samples in FIG. 7.

| Sample | Composition |
| --- | --- |
| a | 35% MUP/65% UP/ST/1.5% MgO/1% PDO |
| b | 100% UP/ST/1.5% MgO/1% PDO |
| c | 100% MUP/ST/3% MDI/1% PDO |

For this comparison, viscosity was measured by RDA II under a shear rate of 0.1 sec$^{-1}$.

As shown in FIG. 7, the 100% UP/MgO system exhibited a significant viscosity drop at the beginning of heating followed within about 30 seconds with a significant viscosity increase. This was probably due to the relaxation of ionic bonds at elevated temperatures in the beginning followed by initiation of the curing reaction. On the other hand, for the 100%MUP/MDI system, resin viscosity decreased gradually at the beginning of heating, and continued to drop despite of the commencement of the resin cross-linking reaction. This implies that the effect of the bond breakage of the diketo groups was larger than the effect of cross-linking in this stage. Viscosity started to increase after 140 seconds when cross-linking dominated the viscosity change. For the 35%MUP/65%UP/MgO system, the viscosity showed a substantial drop at the beginning of heating, similar to that of the UP/ST/MgO system. Viscosity remained low for about 60 seconds before starting to increase, similarly to that of the MUP/ST/MDI system. The early viscosity drop was due to the relaxation of MgO bonds, while viscosity remained low because of bond breakage of the diketo groups.

This example shows that different viscosity profiles can be built into specific UPR systems by using different combinations of the resins and thickeners, as desired.

Curing Behavior

The curing behaviors of UP and MUP based systems were investigated by differential scanning calorimetry. The DSC scanning data showed a typical bell shaped reaction curve for the unthickened UP/ST system and the thickened UP/ST/MgO system. The peak temperatures of these two samples were similar. For the thickened UP/ST/MDI system DSC showed that the major reaction occurred at lower temperature. This is believed due to the catalytic effect of the amide groups in the system. See, Chou, Y. C. and Lee, L. J., "Interpenetrating Polymer Networks", D. Klempner, L. H. Sperling and L. A. Utacki, eds., *Advances in Chemistry*, Series NO. 239, ACS, Washington, D.C. 305(1993). A small secondary reaction peak occurred at higher temperatures, probably due to the thermally induced polymerization.

For the MUP system of the present invention, DSC showed for all cases, whether thickened or unthickened, that an endothermic peak occurred before the major reaction peak. A sharp and narrow endothermic peak appeared around 110° C. for the unthickened compound, while a broader endothermic peak was found around the same temperature for the modified UP thickened with MDI. The reaction peak occurred at 148° C. for the unthickened sample, and was accelerated to 135°–136° C. by the presence of MDI. A shoulder was observed at higher temperatures for the thickened samples. This is similar to that of samples based on the regular UP resin. In general, the modified UP resin tended to react slightly slower than the unmodified resin. Thickening with MDI tended to shift the reaction peak to a lower temperature and resulted in a secondary reaction peak (or shoulder).

This confirms that the diketo groups introduced into the UPR system in accordance with the present invention decomposed immediately before major curing occurs, thereby enabling UPR systems produced in accordance with the present invention to exhibit excellent material flow during the molding operation.

II. EXPERIMENTS ILLUSTRATING FORMATION OF DIKETO-MODIFIED LOW PROFILE ADDITIVES AND THEIR EFFECT ON THICKENING BEHAVIOR AND SHRINKAGE CONTROL OF UPR SYSTEMS

EXPERIMENTAL

Synthesis of Modified Low Profile Additives (LPA-M)

A poly(vinyl acetate) based LPA exhibiting some terminal carboxyl groups (LP40AS, Union Carbide) was used as the standard LPA in this study. LP40AS was also used to synthesize the diketo-containing thermally-breakable LPA's used in these experiments, i.e. the LPA-M.

Diketoglonic acid (DKGA) was grafted onto LP40S via 1,6-hexanediamine as an intermediate using the synthesis of Reactions (2) and (3) above. For this synthesis, 30 wt. % LP40AS was dissolved in tetrahydrofuran (THF). Sufficient 1,6-hexanediamine was then added into the polymer solution so that the molar ratio of amine groups to carboxyl groups was 2.2. The solution was well stirred and the pH was checked periodically with pH paper. After an hour, a diketoglonic acid/water solution prepared according to Penney and Zilvz as described above was added to the solution until the polymer solution was neutralized. This mixture was stirred for 2 hours at room temperature. The modified LP40AS (LPA-M) so formed was precipitated with hexane and dried under vacuum at room temperature.

The properties of the LPA-M as formed were characterized using a FT-IR spectrometer (20 DX, Nicolet), and a differential scanning calorimeter (DSC 2910, TA Instruments).

Thickening and Curing

A series of four cured UPR systems were produced to illustrate the effect of using the LPA-M. In these experiments, a commercially available UP resin (Q6585, Ashland) with a number average molecular weight of 1580 was used as the UPR. Q6585 consists of polymerized maleic anhydride and propylene glycol and exhibits an average of 10.13 C=C bonds per molecule. The acid value and the hydroxyl value of this UP resin are the same (about 35). The resin was shipped as a 65 wt. % solution of UP in styrene. Extra styrene was added to the UP resin to adjust the molar ratio of styrene to ethylenic unsaturation in the polyester molecules to a value of 2:1 (about 41 wt. % of UP in styrene). In these experiments, both MgO and MDI were used as thickeners. Also, 1 wt. % t-butyl perbenzoate (TBP) was included in each sample as a polymerization initiator.

The compositions of the four samples are set forth in the following Table 4. In this table, the numbers given are in weight percents. These weight percents for the TBP, MgO and MDI concentrations are based on the weight of the entire system. The weight percents of the styrene and polyester are based on the total weight of polyester plus styrene only.

TABLE 4

| Sample UPR System Compositions for LPA Comparisons. | | | | | | | |
|---|---|---|---|---|---|---|---|
| System | LPA | LPA-M | UP | styrene | TBP | MgO | MDI |
| Unthickened LPA | 15.0 | — | 35.0 | 50.0 | 1.0 | — | — |
| LPA/MgO | 15.0 | — | 35.0 | 50.0 | 1.0 | 1.5 | — |
| LPA/MDI | 15.0 | — | 35.0 | 50.0 | 1.0 | — | 6.0–9.0 |
| LPA-M/MDI | — | 15.0 | 35.0 | 50.0 | 1.0 | — | 6.0–9.0 |

TABLE 4-continued

The thickened systems were cured in a metal mold (229 mm×181 mm×6.5 mm) with a cavity size of 30 mm in diameter and 1.5 mm in thickness in a laboratory press (Fred S. Carver). Each sample was cured at 150° for 10 minutes under a pressure of 10.3 MPa (1500 psi). To control the viscosity of the thickened resins, heating was started when the viscosity of all thickened resins reached about $2 \times 10^7$ cP.

Material Characterization a) Viscosity measurement

Viscosity increase during thickening and upon curing were measured using a Brookfield viscometer (RVTD, DV-I+ Viscometer, Brookfield Engineering Laboratories Inc.) with a No.6 or No.7 spindle at a speed varying from 0.3 to 2.5 rpm. Each sample was loaded in a glass tube (25 mm in diameter). For heating, each test tube containing a thickened resin sample was placed in an oil bath whose temperature set at either 100° C. or 150° C. In those experiments where polymerization was undesired, 1 wt. % of benzoquinon was added to the resin mixture in place of the initiator normally present.

b) Morphological observation

The cured samples were cracked open at room temperature, soaked in dichloromethane for 3 hours to remove LPA and dried overnight. The samples were then sputtered with gold (DESK II, Denton Vacuum Inc.) and a cross-section of each sample was observed with a scanning electron microscope (S-510, Hitachi) at 25 kV.

c) Internal surface area measurement

To measure the surface area of the micro-voids in the cured resin, the cracked samples were pre-dried overnight in an oven at 120° C. The samples were then placed in a flask and further dried under vacuum for 18 hours at 120° C. The internal surface area of samples was measured by the BET technique with a BET analyzer (Accusorb 2100E, MicroMeritics) with Krypton as an absorbent.

RESULTS AND DISCUSSION

Synthesis of LPA-M

The progress of each reaction was determined by the measurement of the pH of the solution. Because of the presence of carboxyl groups in LPA, the initial pH value of the solution of LP40AS and THF was 3. When 1,6-hexanediamine was added to the solution, the pH increased to 9. No crosslinked products were formed in the solution. The concentration of pendant amine groups in the formed polymer was measured by precipitating the polymer from solution with n-hexane. The amine concentration was then determined by titration with 0.1N aqueous HCl.

If each carboxyl group of the LP40AS molecule reacted with one of the two amine groups of a 1,6-hexanediamine molecule pendant amine group on the LPA chain, the molar ratio of the pendant amine groups to the initial carboxyl groups in the LPA should be 1.0. The actual value was found to be 1.08. Thus, it was concluded that all carboxyl groups in the LPA had reacted with one amino group of an 1,6-hexanediamine molecule to bond the diamine to the LPA via an amide linking and to present a free pendant amine group at the other end of the diamine. These pendant amine groups were then reacted with the carboxyl groups of the added DKGA. This was done by adding DKGA to the polymer solution until the solution was neutralized.

FT-IR spectra confirmed that both 1,6-hexanediamine and DKGA were linked to the LPA-M.

In order to investigate the thermal decomposition behavior of the diketo groups introduced into the modified LPA, differential scanning calorimetric (DSC) measurements were conducted. For the unmodified LP40AS, no peaks were observed. The modified LPA, however, exhibited a clear endothermic peak above 80° C. This observed peak temperature (113.1° C.) is very close to the thermal decomposition temperature of DKGA (125° C.). When the LPA-M sample was reheated in the DSC, no endothermic peak appeared. Thus, it is concluded that the modified LPA's of the present invention incorporate the diketo group and moreover that, upon heating, the diketo groups in the modified LPA irreversibly decompose staring at 80° C. and reaching a peak decomposition temperature around 113° C.

Viscosity Changes during Thickening and Heating

Figure 8:
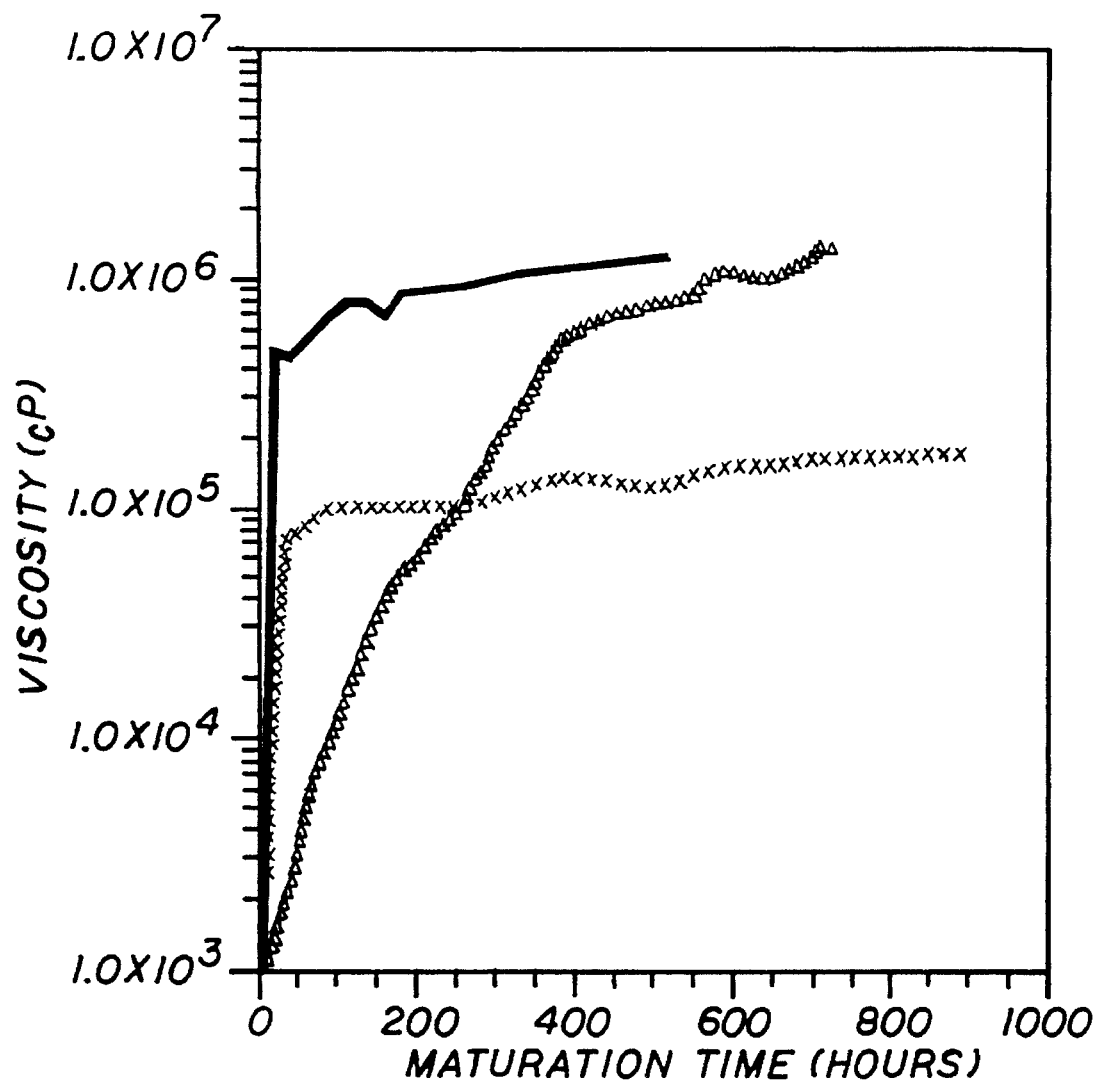
FIG. 8 is a graph similar to FIG. 1 showing viscosity profiles during thickening of a number of UPR systems including one in which a modified LPA in accordance with the present invention is included in the UPR system.

FIG. 8 shows viscosity increase during thickening at room temperature for three of the UPR resin systems of Table 4. The initial viscosity was $1.13 \times 10^3$ cP for all resins. The viscosity of LPA/MgO system increased gradually, and reached $10^6$ cP after about 600 hours. After 600 hours, the viscosity still increased slightly. This agreed well with the literature results. See, Melby E. G., Castro J. M., 7, Ch. 3, *Comprehensive Polymer Science*, Pergamon Press Oxford UK (1989). After 650 hours, the viscosity of the LPA/MgO sample became unstable and varied between $5 \times 10^6$ and $1 \times 10^7$ cP.

For MgO thickened UP systems, it has been reported that the thickening behavior is controlled by two chemical structures. These structures are sensitive to water content and can change easily by varying the humidity in the atmosphere. The unstable viscosity after the thickening of the above MgO thickened sample is believed due to the chemical structure change of these thickened bonds. In contrast, the viscosity of the LPA and the LPA-M based resins thickened with 6 wt. % of MDI increased rapidly during the first 40 hours, and then remained nearly unchanged for 3 months.

Since thickening behavior is controlled by the chemical reaction of the hydroxyl/carboxyl groups of LPA/LPA-M or UP, it is not surprising that after the reaction is completed, the viscosity of the MDI-thickened resins remained unchanged. Moreover, it was found that there was little difference in thickening behavior between the LPA and the LPA-M based resins thickened with MDI, except for the final viscosity value. The final viscosity of the LPA-M based resin ($1 \times 10^6$ cP) was larger than that of the LPA based resin ($1 \times 10^5$ cP). This is probably due to the difference of functional groups in LPA-M and LPA. The molar concentration of the hydroxyl groups in the LPA-M based system was nearly three times that of the carboxyl groups in the LPA based system. For 6 wt. % of MDI, the molar ratio of the isocyanate groups in MDI to the thickenable functional groups in both LPA and UP (i.e. the carboxyl plus the hydroxyl groups) was 0.93 for the LPA based resin and 0.84 for the LPA-M based resin. Furthermore, each LPA-M molecule has three hydroxyl groups which may result in crosslinking with MDI. Consequently, the final viscosity of the LPA-M based resin was larger than that of the LPA based resin.

In order to investigate the thermal decomposition behavior of the thickened resin in the molding process, the viscosity changes of the thickened resins during curing were measured for the LPA/MgO, LPA/MDI and LPA-M/MDI samples. MDI concentration was set at 9 wt. % (i.e. a stoichiometric value equal to the thickenable groups in the LPA-M based resin). To control viscosity differences of the thickened resins, heating of the thickened resins started when each sample's viscosity reached $8 \times 10^6$ cP during thickening.

Figure 9:
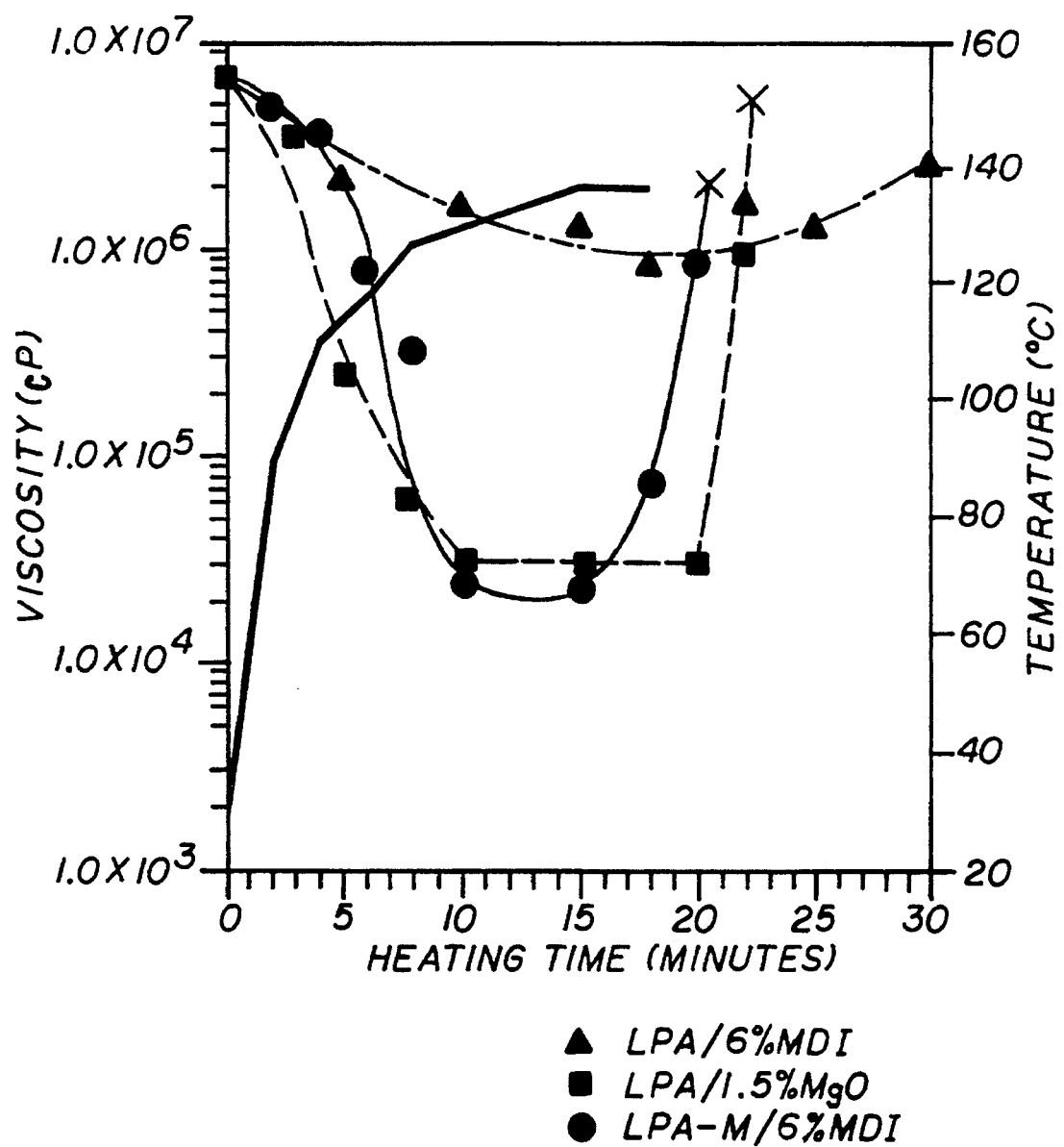
FIG. 9 is a graph illustrating the relationship between viscosity change, resin temperature and heating time in two UPR systems using conventional LPA's and a third UPR system using a modified LPA produced in accordance with the present invention.

FIG. 9 shows the relationship between viscosity change, resin temperature and heating time. For the LPA/MDI based system, there is no thermally breakable bond in the thickened resin. As expected, the viscosity of this sample decreased slightly from $8 \times 10^6$ cP to $1 \times 10^6$ cP in response to increasing the temperature from 25° to 136° C.

For the LPA/MgO based system, the viscosity started to decrease from a very early stage of heating. The minimum viscosity reached was $3 \times 10^4$ cP. After 20 min, the viscosity of the sample increased drastically probably due to the thermal polymerization of UP and styrene.

For the LPA-M/MDI based system, the sample viscosity dropped slightly before the temperature reached 100° C. Above 100° C., the viscosity decreased rapidly, indicating that the thermally breakable groups started to decompose around 100° C. The minimum viscosity reached was $2.2 \times 10^4$ cP. After 15 minutes, the viscosity of the sample increased drastically. Compared to the LPA/MgO sample, the rate of viscosity drop of the LPA-M/MDI sample was smaller before 100° C. but larger above 100° C. This indicates that the LPA-M/MDI based resin kept its viscosity during the early stage of molding when the compound temperature was below 100° C. but reached a lower viscosity than the conventional MgO or MDI thickened compounds when the material temperature was above 100° C. in the mold.

If all thickening bonds were broken upon heating, the viscosity of the thickened resins should reach the initial viscosity of the unthickened resins (i.e. $1.13 \times 10^3$ cP). This apparently did not occur. The minimum viscosities of the LPA-M/MDI based system and the LPA/MgO based system were both larger than the initial viscosity of the unthickened resins. In the LPA-M/MDI system, MDI probably reacts with both LPA-M and UP. The chemical bonds between the UP and the MDI molecules would not break by heating, thus, resulting in a larger minimum viscosity. In the LPA/MgO based system, the ionic bonds between the MgO and the LPA/UP molecules may become weaker at elevated temperatures. However, all of these bonds probably do not break. Consequently, the minimum viscosity reached during heating was much higher than the initial viscosity of the unthickened resin.

Morphology of Cured Samples

The phase separation mechanism of low shrink UP resins has been explained by some researchers as follows. When polymerization starts, the LPA becomes incompatible with the UP resin. This forces UP microgels to coagulate and separate from the LPA-rich phase. Microvoids form in the LPA-rich phase or in the interface between the LPA-rich and the UP-rich phases and these microvoids compensate for polymerization shrinkage of the UP resin.

To determine the effect of using the modified low profile additives of the present invention on shrinkage control, the UPR systems described above were subjected to curing and the physical appearance of each system was observed both before and after curing. In addition, cross-sections of each cured sample were subjected to scanning election microscopy to produce SEM micrographs, which were also observed and compared. The following results were observed.

Before curing, all resin mixtures were transparent, except for the LPA/MgO sample. Because of the low solubility of MgO in the resin mixture, the LPA/MgO sample was turbid. After curing, the unthickened and the LPA-M/MDI samples turned opaque. The cured sample of LPA/MgO however, was translucent, while the cured LPA/MDI sample remained largely transparent.

If sample opacity is an indication of heterogeneous polymer structure and/or the presence of voids, these results suggested that a strong phase separation and microvoid formation have occurred in the unthickened and LPA-M/MDI samples, some phase separation and microvoid formation occurred in the LPA/MgO sample, while little phase separation and microvoid formation occurred in the LPA/MDI sample during curing. This order is reasonable considering that LPA molecules were not linked to the UP resin in the unthickened sample and could be easily separated from the thickened UP resin at elevated temperatures in the LPA-M/MDI system. Therefore phase separation between LPA and LPA-M and the cured UP resin was strong, and microvoids could be easily formed in these samples. In the thickened LPA/MgO sample, the ionic bonds could be weakened but not completely broken by heating. Consequently, phase separation and microvoid formation were not as strong as in the first two samples. In the thickened LPA/MDI sample, the LPA and UP molecules remained chemically bonded during curing. Therefore, little phase separation could occur.

Examination of SEM micrographs of the cross-section of the cured samples revealed the following information. For the unthickened sample, the structure of aggregated globules was clearly observed. The average diameter of these globules was 1.5 micrometers. For the LPA-M/MDI sample, a structure of aggregated globules was also observed. The diameter of these globules (500 nm) was smaller than those of the unthickened sample (1.5 um). This is probably due to the change of compatibility between UP and LPA when LPA was modified. For the LPA/MgO sample, the globular type structure could be seen. However, many globules were linked together. Thus, it is concluded that the performance of LPA on phase separation was reduced by thickening with MgO. For the LPA/MDI sample, although there were some large globules, no clear phase separation could be observed. Most globules were linked to the continuous phase because the bonds between the LPA molecules and the UP resin could not be broken.

To quantify the amount of microvoids in the cured samples, surface areas measurement by the BET (Brunauer, Emmitt and Teller) technique was used on the three samples illustrated in FIG. 9 plus an unthickened sample made from 15 wt. % LPA and 50 wt. % styrene. The results obtained are set forth in the following Table 5.

TABLE 5

| Sample | Surface Area Measurements Maximum Surface Area $M^2/g$ |
|---|---|
| LPA/MDI | 0.1–0.2 (est)* |
| Unthickened LPA | 0.797 |
| LPA/MgO | 0.349 |
| LPA-M/MDI | 0.674 |

*Estimated value. Surface area too small to be measured by equipment employed.

As shown in Table 5, the surface area of the unthickened LPA sample was the highest of all samples. The clear phase separation observed by SEM for the unthickened sample supports this result. The LPA/MDI sample showed the minimum surface area due to poor phase separation. For the LPA/MgO sample, the surface area of 0.349 $m^2/g$ was between that of the unthickened sample and that of the LPA/MDI sample. This again indicates that the effect of LPA on the shrinkage control was reduced by the MgO thickening.

Of the three thickened samples, the LPA-M/MDI sample showed the largest surface area (0.674 $m^2g^{-1}$). This value is very close to that of the unthickened sample, which suggests that LPA-M may act as a better shrinkage controller than the LPA thickened with MgO.

Effect of Temperatures on Sample Morphology

In order to investigate if temperature has any effect on sample morphology, additional curing experiments were carried out at 125° C. instead of 150° C., again for 10 minutes curing time. The compositions of the samples remained the same as in Table 5 except that 1 wt. % of t-butyl peroctate (PDO) was used as the initiator in order to keep the high reaction rate.

During curing, the unthickened sample turned from a transparent yellowish solution to a white opaque solid as in the case of 150° C. curing. Moreover, an SEM micrograph of the cured product showed clear phase separation with aggregation of globules. The average diameter of globules was 1.2 micrometers, which is nearly the same as those of the sample cured at 150° C.

The thickened LPA/MgO sample turned from a slightly yellowish turbid mixture to a translucent white solid during curing. The LPA/MgO sample cured at 125° C. was much more translucent than that cured at 150° C. An SEM micrograph of the LPA/MgO sample cured at 125° C. showed a flake like structure. This indicates that phase separation in this sample was less than that cured at 150° C. (FIG. 8c). This, in turn, implies that the shrinkage control performance of the LPA thickened with MgO may decrease when the curing temperature is reduced from 150° C.

The thickened sample of LPA-M/MDI turned from a transparent brown mixture to a slightly brown opaque solid during curing, which was similar to the case of 150° C. curing. Moreover, an SEM micrograph of the LPA-M/MDI sample cured at 125° C. showed an aggregation structure of globules with 500 nm diameters, very similar to that of sample cured at 150° C. These results suggest that the efficiency of LPA-M should remain the same when the curing temperature is reduced from 150° C. to 125° C.

To further investigate the effect of temperature on the morphology of LPA-M/MDI sample, additional curing experiments were carried out at 80° C. and 60° C. with 2,5-dimethyl-2,5-di(2-ethylhexanoylperoxy) hexane (Lupersol 256) as the initiator. At 80° C., the cured sample also turned to an opaque solid. The sample cured at 60° C., however, was mostly translucent. SEM micrographics of the two samples showed a clear phase separation can be seen in the 80° C. cured sample, but not in the 60° C. cured sample. This indicates that most thickening bonds did not break at 60° C.

Because of reaction exotherm, sample temperature could be much higher than the mold temperature during curing. To verify this, the temperature at the center of the sample was measured by a thermocouple during curing. For the sample cured at 80° C., the inside temperature reached 103° C. while the maximum temperature for the sample cured at 60° C. was only 64° C. These results together with the DSC results mentioned above confirm that decomposition of thickened bonds in the LPAM/MDI sample determined the morphology of the cured resin and the bond decomposition could be controlled by changing temperature.

From the foregoing, it can be seen that the modified low profile additives (M-LPA) of the present invention allow formation of UPR systems exhibiting excellent material flow during molding, even if such systems employ diisocyanates as the maturation agent. Hence, it is possible in accordance with the present invention to develop specific UPR systems which not only are especially useful in both bulk molding and sheet molding operations but which also exhibit viscosity profiles making them very easy to use.

GENERAL

Although only a few embodiments of the invention have been described above, it should be appreciated that many modifications can be made without departing from the spirit and the scope of the invention.

For example, it should be appreciated that in actual practice, branching often occurs in many different UPR systems. This occurs because one or more of the polymerizable components in the system has multiple terminal hydroxyl, carboxyl or other condensation-polymerizable groups. The present invention is applicable to all such systems, regardless of the amount of branching employed. Moreover, additional branching can be purposefully introduced into such systems in accordance with the present invention by using multi-functional amines rather than di-functional amines for incorporating the diketo group into the polyester molecule and by using LPA's with multi-functional groups.

Furthermore, although the present invention has referred to only two types of maturation agents, namely MgO-type compounds and diisocyanates, it should be appreciated that other maturation agents can also be used. For example, certain diepoxy compounds are known to function as maturation agents in a similar manner to diisocyanates. So long as a compound is capable of coupling multiple LMWUPR molecules together via their terminal carboxyl or hydroxyl groups without significant decomposition of the ethylenic unsaturation therein, it can be used as a maturation agent in accordance with the present invention. Of course, the types and amounts of the other ingredients in the system, including the diketo group, will need to be adjusted to accommodate the particular properties of this material.

Furthermore, although the specific mechanism for incorporating the diketo group into the UPR polymer system in the foregoing description is based on amidation of the LMWUPR or LPA with a diamine followed by further amidation with 2,3-diketoglonic acid, it should be appreciated that any technique for introducing the diketo group into the UPR system can be employed for this purpose so long as the amount of diketo groups introduced into the UPR system and the location of such groups when so introduced are sufficient to allow viscosity decrease of the system under curing conditions as a result of polymer chain severing.

Also, as used herein "low" molecular weight and "high" molecular weight are not intended to refer to any particular molecular weight but rather to the relation between the molecular weights of the unthickened UP starting resin and the thickened UPR. Typically, LMWUPR's available commercially contain about 4 to 50, more normally about 6 to 20 repeating polyol/acid (or anhydride) polyester units and exhibit molecular weights has low as 300 to as high as 50,000, more normally about 1,000 to 10,000. When thickened, these materials typically are in the form of complex polymer networks, which really have no true "molecular weight" as such. In any event, "low molecular weight" as used herein is intended to included all UP polymers including oligomers which can be thickened to moldable UPR systems. In the same way, "high molecular weight" is intended to include all moldable UPR systems made with any such thickened low molecular weight UP polymer.

In addition, it should also be appreciated that, while the foregoing description discusses improvement in shrinkage control only in connection with using the novel modified low profile additives of the present invention, improvement in shrinkage control also occurs in the other embarkments of the invention as well, whether or not a modified LPA of the present invention is also used.

All such modifications are intended to be included within the scope of the present invention, which is to be limited only by the following claims:

We claim:

1. A method for making a modified low profile additive comprising:

(a) reacting a low profile additive having carboxyl groups with a diamine to produce a first LPA reaction product; and (b) reacting said first LPA reaction product with the reaction product of ascorbic acid, hydrogen peroxide and water to form the modified low profile additive.

2. The method of claim 1 wherein the low profile additive is poly(vinyl acetate).

3. The modified low profile additive produced by the method of claim 1.

* * * * *